(12) United States Patent
Yamada

(10) Patent No.: US 8,059,286 B2
(45) Date of Patent: Nov. 15, 2011

(54) SYSTEM AND PROGRAM PRODUCT

(75) Inventor: Kaori Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 11/971,632

(22) Filed: Jan. 9, 2008

(65) Prior Publication Data
US 2008/0180703 A1 Jul. 31, 2008

(30) Foreign Application Priority Data

Jan. 22, 2007 (JP) ................. 2007-011956

(51) Int. Cl.
*G06F 3/12* (2006.01)
*H04N 1/40* (2006.01)
*H04N 1/32* (2006.01)
(52) U.S. Cl. .............. 358/1.13; 358/442; 358/468
(58) Field of Classification Search ............. 358/448, 358/443, 404, 444, 400, 401, 471
See application file for complete search history.

(56) References Cited

U.S. PATENT DOCUMENTS

| | | | |
|---|---|---|---|
| 6,920,567 B1 * | 7/2005 | Doherty et al. | 726/22 |
| 7,379,620 B2 * | 5/2008 | Kobayashi | 382/284 |
| 7,471,404 B2 * | 12/2008 | Kakiuchi et al. | 358/1.14 |
| 7,864,955 B2 * | 1/2011 | Uchikawa et al. | 380/51 |
| 2003/0151755 A1 * | 8/2003 | Nishio et al. | 358/1.9 |
| 2005/0099509 A1 * | 5/2005 | Kobayashi | 348/229.1 |
| 2006/0168119 A1 * | 7/2006 | Inoue et al. | 709/218 |

FOREIGN PATENT DOCUMENTS

| | | |
|---|---|---|
| JP | 2004-310746 | 11/2004 |
| JP | 2004-310747 | 11/2004 |

* cited by examiner

*Primary Examiner* — Jerome Grant, II
(74) *Attorney, Agent, or Firm* — Cowan, Liebowitz & Latman, P.C.

(57) ABSTRACT

This invention suppresses accidental change of an adjustable parameter that influences a print job. For this purpose, when the print data of a certain job exists in a storage unit, change of the adjustable parameter by a user interface is inhibited.

6 Claims, 27 Drawing Sheets

FIG. 10A  BOX LIST

| BOX NUMBER | DOCUMENT NAME |
|---|---|
| 00 | BOX 0 |
| 01 | BOX 1 |
| 02 | BOX 2 |
| 03 | BOX 3 |
| 04 | BOX 4 |
| 05 | BOX 5 |

SYSTEM STATUS / STOP — BOX

FIG. 10B  BOX LIST

INPUT PASSWORD
****
CANCEL   OK

SYSTEM STATUS / STOP — BOX

FIG. 10C  BOX JOB LIST

| ACCEPTANCE NUMBER | DOCUMENT NAME | USER NAME | STATUS |
|---|---|---|---|
| 001 | DOCUMENT 1 | USER 1 | HELD |
| 002 | DOCUMENT 2 | USER 2 | HELD |
| 003 | DOCUMENT 3 | USER 3 | HELD |

PRINT   CLOSE

SYSTEM STATUS / STOP — BOX

FIG. 10D  PRINT

READY FOR PRINT   CHANGE PRINT SETTINGS
1                 ERASE AFTER PRINT
TEST PRINT
CANCEL            PRINT

SYSTEM STATUS / STOP — BOX

FIG. 12A

HOLD TAB

HOLD JOB LIST

| ACCEPTANCE NUMBER | DOCUMENT NAME | USER NAME | STATUS |
|---|---|---|---|
| 001 | DOCUMENT 1 | USER 1 | HELD |
| 002 | DOCUMENT 2 | USER 2 | HELD |
| 003 | DOCUMENT 3 | USER 3 | HELD |

[PREVIEW] [TEST PRINT] [PRINT] [ERASE] [EDIT]

ACTIVE JOB LIST

FIG. 12B

HOLD TAB

ACTIVE JOB LIST

| ACCEPTANCE NUMBER | DOCUMENT NAME | USER NAME | STATUS | PREDICTED TIME |
|---|---|---|---|---|
| 123 | DOCUMENT 99 | USER 99 | PRINT | 10 MINUTE |
| 124 | DOCUMENT 98 | USER 98 | STANDBY | 20 MINUTE |
| 125 | DOCUMENT 3 | USER 3 | STANDBY | 30 MINUTE |

[PRIORITY PRINT] [STOP] [ADVANCED SETTINGS] [PAUSE]

HOLD JOB LIST

F I G. 26
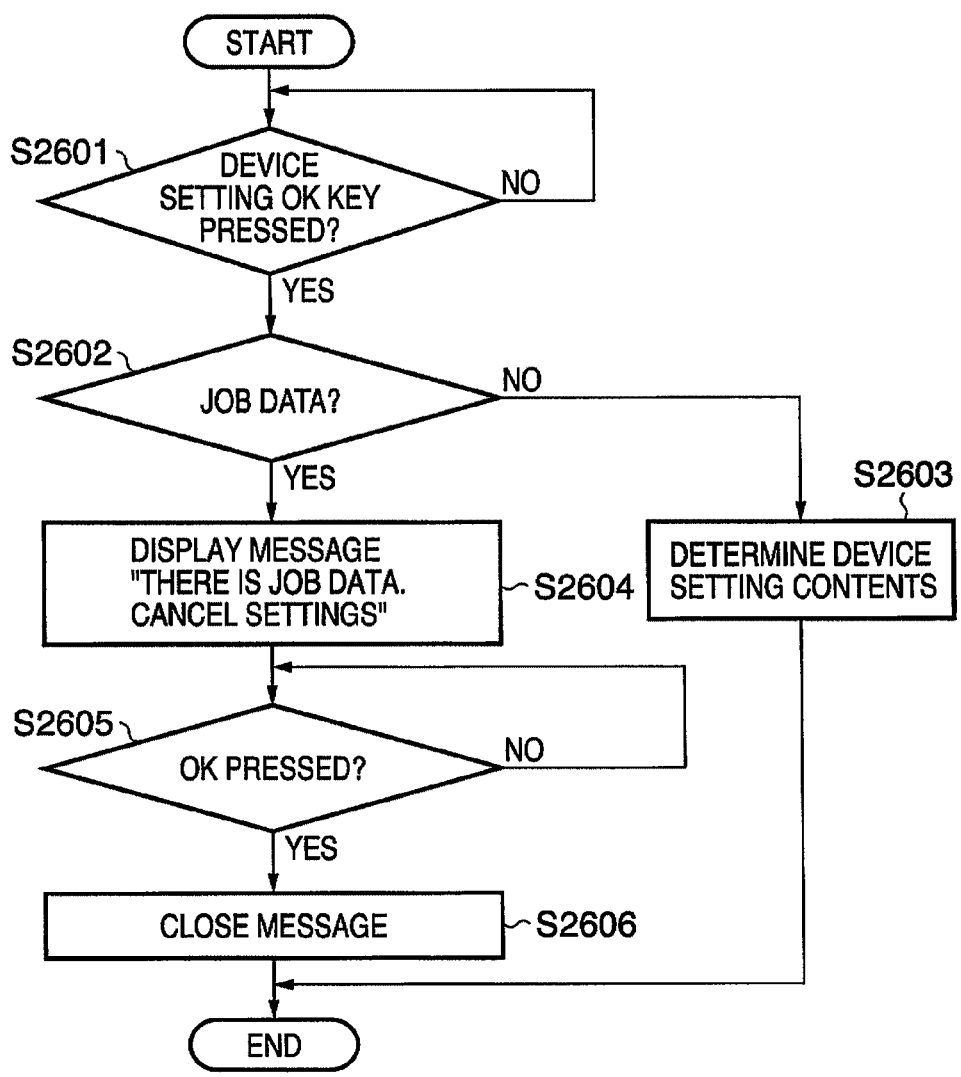

SYSTEM AND PROGRAM PRODUCT

BACKGROUND OF THE INVENTION

1. Field of the Invention

The present invention relates to a system adapted to enable a user interface to change an adjustable parameter about processing by a printing system, and a program product.

2. Description of the Related Art

In the commercial printing industry, publications are issued through various kinds of work steps including entry of a document, designing of the document, layout editing, comprehensive layout (presentation by printing), proofreading (layout correction and color correction), proof (proof print), block copy preparation, printing, post-processing, and shipping.

In the conventional printing industry, an offset reproduction printing press is often used in the printing step, and the block copy preparation step is inevitable. However, once the block copy is prepared, it is difficult and disadvantageous in terms of cost to correct the block copy. In block copy preparation, therefore, careful proofreading (i.e., careful layout check and color confirmation) is indispensable. Some period of time is generally taken until a publication is issued.

In the commercial printing industry, most of apparatuses used in the respective work steps are bulky and expensive. Additionally, work in these steps requires expert knowledge and, therefore, know-how of experts called craftsmen.

Under these circumstances, a so-called POD (Print On Demand) market is recently appearing along with the advent of high-speed and high-quality electrophotographic and inkjet printing apparatuses and competing with the commercial printing industry.

The POD market that is replacing the above-described large-scale printing presses and printing methods handles jobs of relatively small lots in a short delivery period without using any large-scale apparatus or system.

In the POD market, digital printing using electronic data is implemented and print services are provided by making the best of printing apparatuses such as a digital copying machine and a digital multi function peripheral.

In the POD market, printing is merged with digitization more than in the conventional printing industry, and management and control using computers become widespread. This actually enables a publication to issue in a short delivery period and obviates know-how of operators (workers). Recently, the quality of printed products is also coming close to the level of the commercial printing industry.

In these situations, office-equipment makers and the like are currently considering to enter the new POD market (for example, Japanese Patent Laid-Open Nos. 2004-310746 and 2004-310747). Particularly, they are recently examining printing apparatuses and printing systems capable of sufficiently satisfying requirements not only in an office environment but also in a POD environment that expects cases of use and needs different from those in the office environment. For a printing environment assumed in the POD market, the method of improving the productivity of a printing system is expected to be important. The method of designing a user-friendly printing system for an operator (worker) while maintaining high productivity is also expected to be important.

As described above, for, for example, an office-equipment maker which is strong in the office environment now and wants to fully enter the new POD market, it is preferable to cope with use cases and user needs that are assumed not in the office environment but in the POD environment. In other words, for full entry in the POD market, it is necessary to conduct sufficient studies for commercializing a digital printing system suitable for even the POD environment. Assuming commercialization of a printing system suitable for the POD environment, however, there is still room for further study and problems and demands to be tackled.

For example, a job to be printed by a printing apparatus is saved in a storage unit. The saved print job is printed in accordance with an instruction from the operation unit of the printing system. If this job holding function is provided, the operator of the system can, for example, print a desired print job at a desired timing. Alternatively, if the operator (worker) of the printing system can flexibly change various device adjustable parameters of the system, the system can be prevented from creating, as an end product, a printed product without quality desired by a customer. The market can demand such a printing system convenient for an operator who works in the printing environment such as the POD environment. However, simply employing these configurations can pose the following problem.

For example, if change of device adjustable parameters is permitted independently of the presence/absence of a print job in the storage unit, a change that affects the print style of the print job saved in the storage unit can be done.

This can be a problem in the POD market that assumes to create a product meeting the request of an end user (customer). That is, the above-described configurations which are provided to meet the possible needs of the POD market may pose a new problem.

SUMMARY OF THE INVENTION

The present invention has been made in consideration of the above-described problems and provides a convenient system and program product adaptable not only to an office environment but also to a POD environment.

The present invention also provides a mechanism for minimizing operator's (worker's) involvements that can occur in a POD environment due to the specifications of an image forming apparatus designed in consideration of only, for example, an office environment, thereby reducing the load on the operator (worker) and implementing an efficient operation.

The present invention also provides a mechanism capable of meeting various needs of various users flexibly as much as possible assuming various situations and use environments.

To solve the problems of the present invention, for example, a system of the present invention has the following arrangement.

That is, a system adapted to enable a user interface to change an adjustable parameter about processing by a printing system, the printing system being adapted to perform print processing for a job that print data are stored in a storage unit, the system comprises:

a first controller adapted to permit a change of the adjustable parameter by the user interface in a case where print data of a certain job having a certain attribute does not exist in the storage unit, the print processing of the print data of the certain job being performed in response to an instruction which is inputted by an indicator after storing the print data in the storage unit; and a second controller adapted to inhibit change of adjustable parameters by the user interface in a case where the print data of the certain job exists in the storage unit.

According to the present invention, it is possible to suppress accidental change of an adjustable parameter that influences a print job. For example, employment of both a job holding function of saving a job to be printed in a storage unit until an output timing desired by an operator and a function of enabling an operator (worker) of a printing system to change an adjustable parameter prevents any new problem so no printed product which is unwanted by a customer is created. That is, the arrangement can contribute to commercialization of a convenient printing apparatus or printing system adaptable not only to an office environment but also to a POD environment.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A to 10D are views showing changes in the box tab window;

FIGS. 12A and 12B are views showing changes in the window when a job in the hold tab is selected;

FIG. 26 is a flowchart illustrating the second embodiment; and

DESCRIPTION OF THE EMBODIMENTS

An embodiment of the present invention will be described below in detail with reference to the accompanying drawings.

Figure 1:
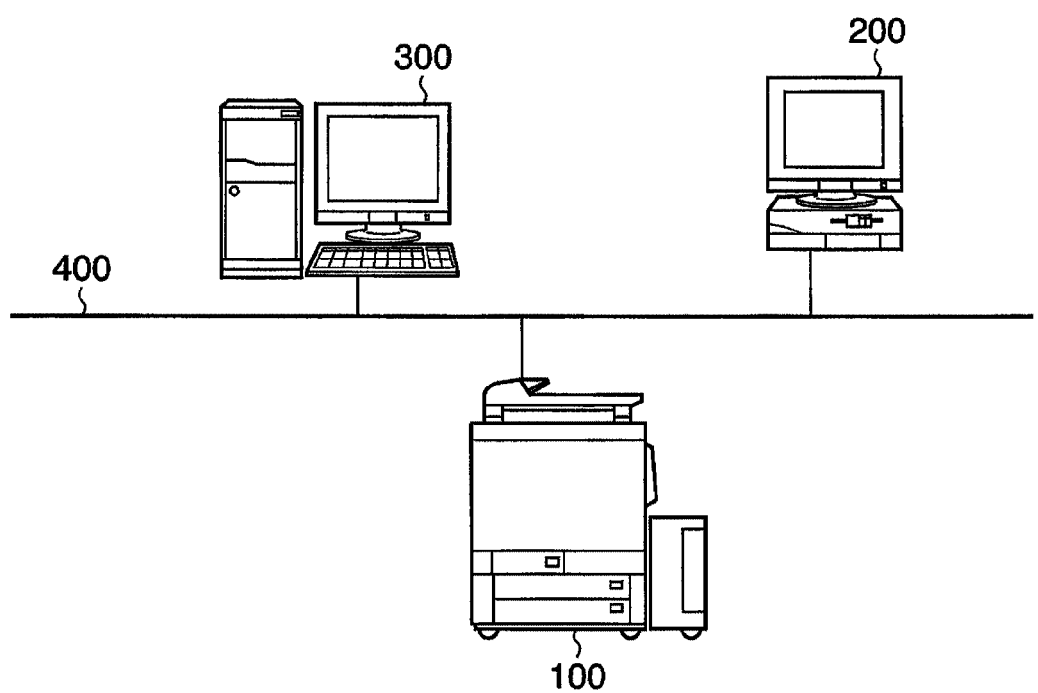
FIG. 1 is a view showing a system configuration according to an embodiment.

FIG. 1 is a view showing the fundamental constituent blocks of an entire network system according to the embodiment. As shown in FIG. 1, an MFP (Multi Function Printer or, generally, Multi Function Peripheral) 100, client PC 200, and print server 300 are connected to a network 400. In the example shown in FIG. 1, single devices are connected. However, the number of connected devices is not particularly limited, and any configuration is applicable if, at least, the image forming system (printing system) can make the MFP 100 process a print job as a process target, as in this embodiment.

The MFP 100 is an image forming apparatus (printing apparatus) which includes a scanner unit for reading an original document and a print unit for forming (printing) an image on a printing medium such as a printing paper sheet and has various functions including network scanner, network printer, and copy functions.

The client PC 200 executes various kinds of application programs in accordance with a user instruction and outputs print data to the network in response to a print request from the user. The client PC 200 also executes assistant processes such as monitoring and control of devices and jobs managed in the print server 300. A print job generated by the client PC is transferred to the MFP 100 directly or via the print server 300.

Figure 2:
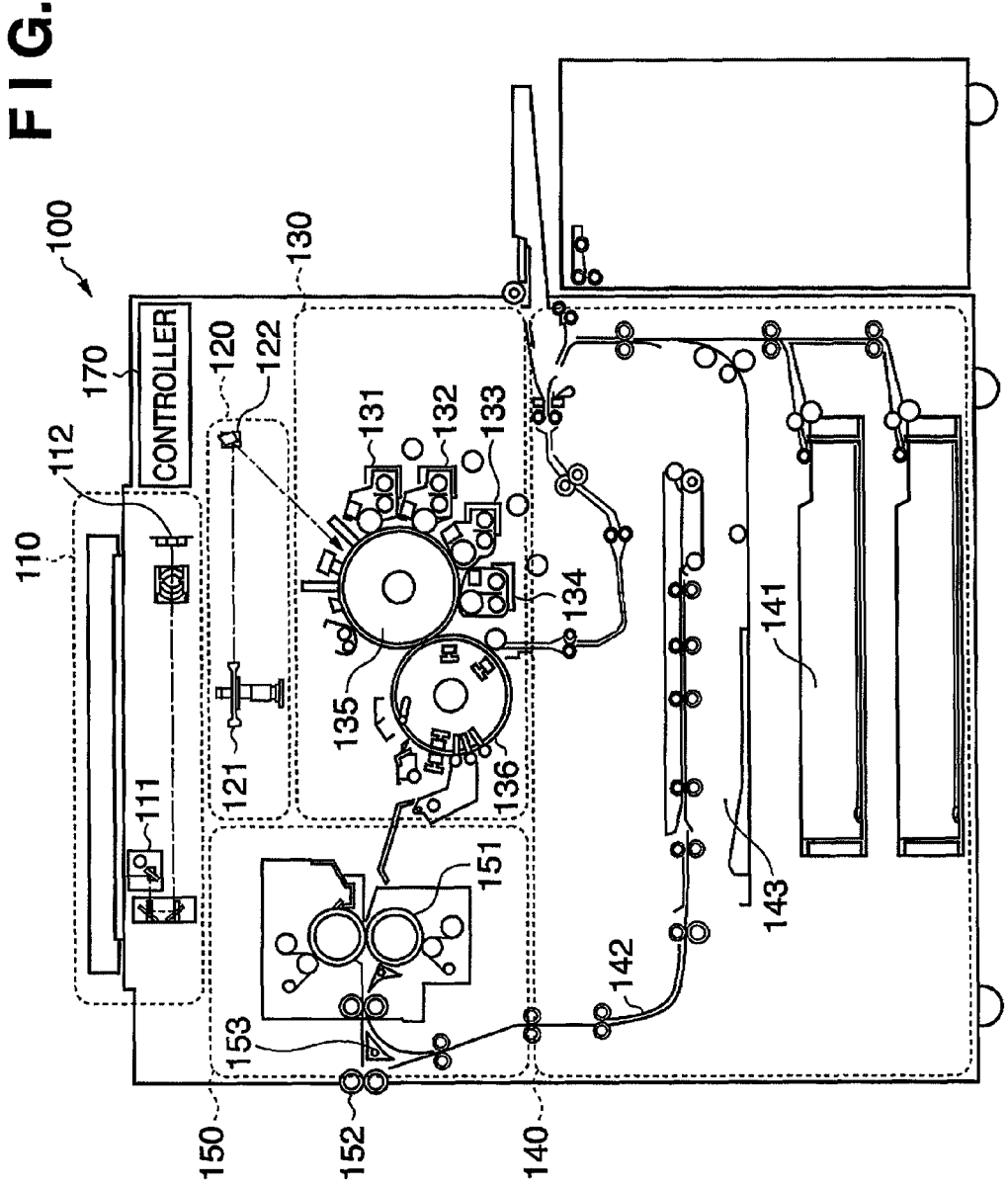
FIG. 2 is a sectional view of a multi function peripheral (MFP) according to the embodiment.

The structure of the MFP 100 will be described next with reference to FIG. 2. FIG. 2 is a sectional view of the MFP 100.

The MFP 100 comprises a scanner unit 110 which reads an image printed on a document surface, a printer unit including units 120 to 150, and a controller 170.

The controller 170 controls the overall apparatus and is mounted in the apparatus as a printed board including a microprocessor. The controller 170 executes read control of the scanner unit 110, network communication, processes corresponding to various operation contents from the user, and print processing (to be described below).

The scanner unit 110 comprises an exposure unit 111 which exposes a document surface and moves and scans on it, and a line CCD 112 which forms an image of light reflected by the document surface and converts the light into an electrical signal. The controller 170 A/D-converts a signal successively output from the line CCD 112, receives the signal as image data, and executes various processes.

The laser exposure unit 120 included in the printer unit has a polygon mirror 121 which is rotated by a motor to scan a laser beam from a laser element (not shown) driven by the controller 170, and a mirror 122 which reflects the laser beam to a photosensitive drum 135.

The image forming unit 130 rotates the photosensitive drum 135 and causes a charger to charge the surface of the photosensitive drum 135. The photosensitive drum 135 holds an electrostatic latent image on its surface as the laser exposure unit scans the laser beam. Developing units 131 to 134 having magenta (M), cyan (C), yellow (Y), and black toners form toner images by attaching the toners to the electrostatic latent image formed on the surface of the photosensitive drum 135. The toner images formed on the photosensitive drum 135 are transferred to a printing paper sheet as a printing medium. For this purpose, a transferring drum 136 which rotates together with the photosensitive drum 135 is provided. A printing paper sheet conveyed from the feed/conveyance unit 140 winds around the transferring drum 136 by the function of static electricity. The transferring drum 136 executes the step of transferring, to the printing paper sheet wound around it, the toner image of one color component formed on the photosensitive drum 135 four times, thereby forming the images of four color components on the printing paper sheet.

When the toner images of the four color components are transferred to the printing paper sheet in the above-described manner, the controller 170 peels off the printing paper sheet from the transferring drum 136 and conveys it to the fixing unit 150. The fixing unit 150 incorporates fixing rollers 151 heated by a heat source such as a halogen heater. The fixing roller 151 dissolves the toners transferred to the printing paper sheet conveyed from the image forming unit 130 and fixes the toners to the printing paper sheet by heat and pressure. Discharge rollers 152 discharge the printing paper sheet with fixed toners to an external unit (finisher unit).

The MFP 100 of the embodiment can perform double-sided printing. A printing paper sheet sensor is provided upstream (on the image forming unit side) of the discharge rollers 152. In the double-sided printing mode, the sensor detects the trailing edge of a printing paper sheet. At this time, the controller 170 pivotally rotates a flapper 153 by a predetermined angle and reverses the rotational directions of the discharge rollers 152 so that the printing paper sheet is turned over and conveyed to a double-sided feeding path 142 in the feed/conveyance unit 140.

The feed/conveyance unit 140 has a sheet storage 143 for double-sided printing, which stores printed paper sheets on one surface near the double-sided feeding path 142. The feed/conveyance unit 140 also has at least one sheet storage 141 represented by a sheet cassette or paper deck. In accordance with an instruction from the controller 170, one of the plurality of sheets stored in the sheet storage 141 or 143 is separated and conveyed to the image forming unit 130 and fixing unit 150.

The arrangement of the controller 170 of the MFP 100 according to the embodiment will be described next with reference to FIG. 3.

The controller 170 of the MFP 100 has an MFP controller 1000 including a microprocessor and memories to store process programs. The MFP controller 1000 performs traffic control to, for example, temporarily save image data in accordance with the purpose of the MFP or decide the data path between various processing units to be described below.

The controller 170 comprises a hard disk (to be referred to as an HDD hereinafter) 1500 that is a mass storage device capable of storing the data of a plurality of jobs. Not the hard disk but any other mass storage device random-accessible is usable.

The MFP controller 1000 implements a plurality of functions such as a process of copying job data output from the scanner and print processing based on job data output from the client PC on the network by using the HDD 1500 as a buffer.

The MFP 100 is a full-color device or monochrome device. The basic constituent elements of full-color and monochrome devices are the same except color processes and internal data. The full-color device includes the arrangement of the monochrome device. Hence, the full-color device will mainly be described herein, and a description of the monochrome device will additionally be made as needed.

Figure 3:
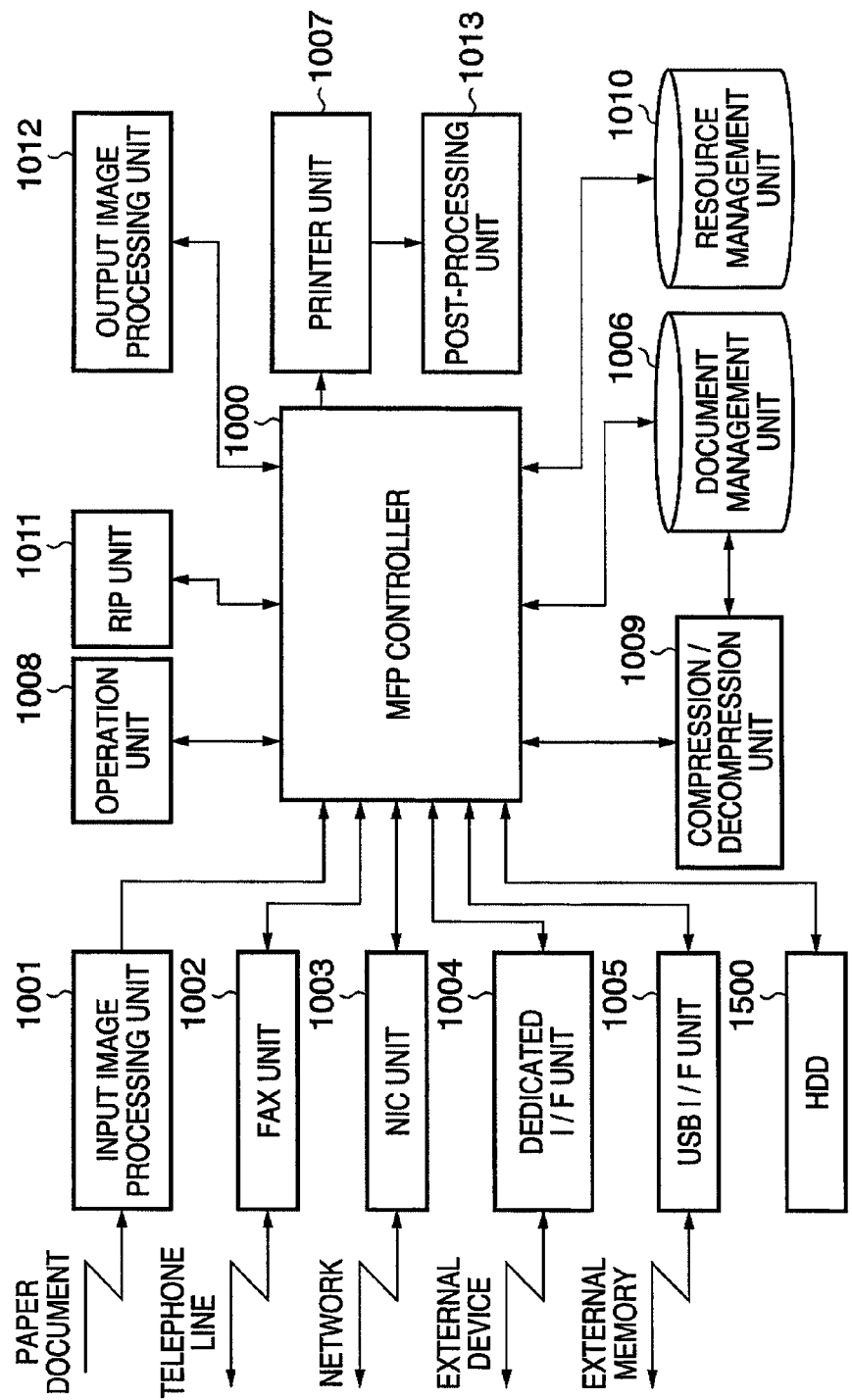
FIG. 3 is a block diagram showing a detailed arrangement of the controller of the MFP according to the embodiment.

As shown in FIG. 3, many processing units are connected to the MFP controller 1000. An input image processing unit 1001 reads an image of, for example, a paper document and processes read image data. A FAX unit 1002 executes image transmission/reception using a telephone line represented by facsimile. An NIC (Network Interface Card) unit 1003 transmits or receives image data or device information by using a network. A dedicated interface 1004 exchanges information such as image data with an external device. A USB (Universal Serial Bus) interface unit 1005 transmits/receives image data or the like to/from a USB device represented by a USB memory (a kind of removable medium).

Under the control of the MFP controller 1000, a document management unit 1006 stores, in the HDD 1500, image data from the input image processing unit 1001, image data of facsimile jobs input via the FAX unit 1002, image data input from an external device such as a computer via the NIC unit 1003, and various kinds of image data input via the dedicated I/F unit 1004 or USB interface unit 1005. The document management unit 1006 also reads out the image data from the HDD 1500 under the control of the MFP controller 1000. The MFP controller 1000 determines the output destination of the image data read out by the document management unit 1006. When the MFP controller 1000 sets the output destination to, for example, a printer unit 1007, print processing is executed. As a result, print processing for copy, network printer, or facsimile reception can be performed. The MFP controller 1000 also transfers the image data read out from the HDD 1500 to an external device such as another computer or another image forming apparatus in accordance with an instruction input from an operation unit 1008 by the operator (worker).

In storing image data in the HDD 1500, the document management unit 1006 compresses the image data as needed. Conversely, in reading out image data compressed and stored in the HDD, the document management unit 1006 decompresses (decodes) the image data to the original size. To do this, a compression/decompression unit 1009 is provided. Upon receiving data compressed by JPEG, JBIG, or ZIP via the NIC unit 1003, the document management unit 1006 controls the compression/decompression unit 1009 to expand (decompress) it.

A resource management unit 1010 readably holds and manages fonts, color profiles, and various kinds of parameter tables such as a gamma table to be commonly handled under the control of the MFP controller 1000. The resource management unit 1010 also stores a new parameter table or corrects and updates a parameter table in response to a request from the MFP controller 1000.

A process executed when the MFP controller 1000 receives print data (PDL data) received from the NIC unit 1003 or dedicated interface 1004 will be described next.

When the MFP controller 1000 receives PDL data, a RIP (Raster Image Processor) unit 1011 executes a RIP process. The MFP controller 1000 also causes an output image processing unit 1012 to process the print target image for printing, as needed. The intermediate data of the image data generated at that time or print ready data (bitmap data for printing or data obtained by compressing it) is stored in the HDD 1500 via the document management unit 1006 as needed. The storage process in the HDD 1500 is executed asynchronously with the printer unit 1007.

On the other hand, the MFP controller 1000 reads out the image data of each page from the HDD 1500 via the document management unit 1006 and outputs the image data to the printer unit 1007 in synchronism with its print process timing. At this time, the MFP controller 1000 controls a post-processing unit 1013 in accordance with the description of the print job. The post-processing unit 1013 controls a finisher unit that executes sorting or finishing of sheets.

The process of the MFP controller 1000 according to the embodiment has been described above roughly. The MFP controller 1000 of the embodiment switches the path of image data to be processed in the following way. The MFP controller 1000 also processes intermediate data, and a description thereof will be omitted. A description of accesses except those which start and end in the document management unit 1006 will be omitted. A sequence will roughly be described by omitting processes of the compression/decompression unit 1009 and post-processing unit 1013 which are used as needed.

A) Copying function: input image processing unit→output image processing unit→printer unit B) FAX transmission function: input image processing unit→FAX unit C) FAX reception function: FAX unit→output image processing unit→printer unit D) Network scan: input image processing unit→NIC unit E) Network printing: NIC unit→RIP unit→output image processing unit→printer unit F) Scan to external device: input image processing unit→dedicated I/F unit G) Printing from external device: dedicated I/F unit→output image processing unit→printer unit H) Scan to external memory: input image processing unit→USB I/F unit I) Printing from external memory: USB I/F unit→RIP unit→output image processing unit→printer unit J) Box scan function: input image processing unit→output image processing unit→document management unit K) Box printing function: document management unit→printer unit L) Box reception function: NIC unit→RIP unit→output image processing unit→document management unit M) Box transmission function: document management unit→NIC unit N) Preview function: document management unit→operation unit In addition, combinations with various functions such as an e-mail service and Web server function are conceivable, though they will be omitted herein.

Box scan, box printing, box reception, and box transmission are the process functions of the MFP accompanying write in the HDD 1500 and read from the HDD 1500 using the document management unit 1006. "Box" indicates a box (folder or directory) provided in the HDD 1500, which is a function of causing the document management unit 1006 to temporarily save data in the HDD 1500 for each job or each user or inputting/outputting data by combining a user ID and password.

The operation unit 1008 functions as a user interface to select the above-described various functions or input an operation instruction. To provide various display menus for the user and display a preview of image data managed by the document management unit 1006, the operation unit 1008 comprises a high-resolution display device, various kinds of instruction buttons, and a touch panel. The user operates the operation unit 1008 even for copy.

The outline of the process of the MFP controller 1000 according to the embodiment will be described next with reference to FIG. 4. This process is implemented by the microprocessor included in the MFP controller 1000, the memory that stores firmware, and various processing units shown in FIG. 3.

A network interface controller 1601 controls the NIC unit 1003, analyzes a communication protocol, receives data from the host computer, and transfers the received data to a job ticket analysis unit. A job ticket analysis unit 1602 analyzes a job ticket added to print data, transmits the attribute of the job to a job controller 1600, registers the job in a management table (not shown), and stores PDL data in a reception buffer.

Upon detecting PDL data storage in the reception buffer, a PDL data analysis unit 1603 starts analyzing the PDL data. More specifically, the PDL data analysis unit 1603 reads out the PDL data stored in the reception buffer, generates an object (intermediate code) corresponding to each command, and stores the objects in an intermediate buffer. In this embodiment, the command supported by the printer is PDL (Page Description Language). The printer supports not only PDL but also any other data that allows printing of each page. The PDL data analysis unit 1603 stores intermediate data as an analysis result in the intermediate buffer to facilitate management of each page.

Upon detecting data storage in the intermediate buffer, a rendering processing unit 1604 starts rendering. More specifically, the rendering processing unit 1604 reads out the data of each page from the intermediate buffer, and in normal printing (when neither box storage nor hold storage is designated), generates print image data of one page and stores it in an image buffer.

Upon detecting that the image data of one page is stored in the image buffer, an output controller 1605 reads out the image data and outputs it to the printer unit.

If a job of interest is designated for job hold storage, the rendering processing unit 1604 sequentially stores the rendered image data of the respective pages in a hold queue. In this case, the output controller 1605 is not activated immediately, and instead, prints the job in accordance with a hold cancel (print) instruction from a UI controller 1606.

The holding function is a function of temporarily storing a job in one of boxes allocated in a storage means such as an HDD and starting printing only when receiving a user instruction from the operation unit 1008. This function is used to perform test print first and, if the print result has no problem, execute final printing (of a plurality of copies). It is therefore unnecessary to retransmit the job data from the host computer again for final printing.

For a box-storage-designated job, the rendering processing unit 1604 stores the rendered image data of each page in a box. The "box" here is equivalent to a folder (directory). Even if the image data are stored in the box, the output controller 1605 is not immediately activated. The output controller 1605 is activated when a job print instruction is received from the UI controller 1606. The boxes are named, for example, "01" to "99", though it changes depending on the capacity of the HDD 1500. This allows the user to selectively use the boxes in accordance with the user or application purpose. It is also possible to set a password for each box.

The UI controller 1606 controls the UI (User Interface). The UI controller 1606 transfers display data to the operation unit 1008 and notifies the MFP controller 1000 of input from the operation unit 1008. In this embodiment, a display unit provided on the operation unit 1008 is a liquid crystal display. The operation unit 1008 has several keys. A touch panel is provided on the front surface of the liquid crystal display. The UI controller 1606 controls to, for example, display a character string corresponding to a user operation, switch the window, and transmit a set value to another module.

The job controller 1600 manages jobs in the device and controls job generation and deletion, job states, and job process order.

Particularly, the job controller 1600 incorporates a print execution queue to determine the storage source of image data to be output to the output controller 1605, a box, image buffer, or hold queue (the print execution queue is a RAM because the information amount is small, though it may be the HDD). For a normal print job, information (job ID to be described later) to specify the job is automatically set in the print execution queue. The job ID of a job in a box or hold queue is registered in the print execution queue only when the user starts printing. Hence, the job controller 1600 determines the storage source of the image data, a box, image buffer, or hold queue based on the job ID registered in the print execution queue. When the storage source is determined, the job controller 1600 controls to output the image data of each page of the job to the output controller 1605.

Figure 19:
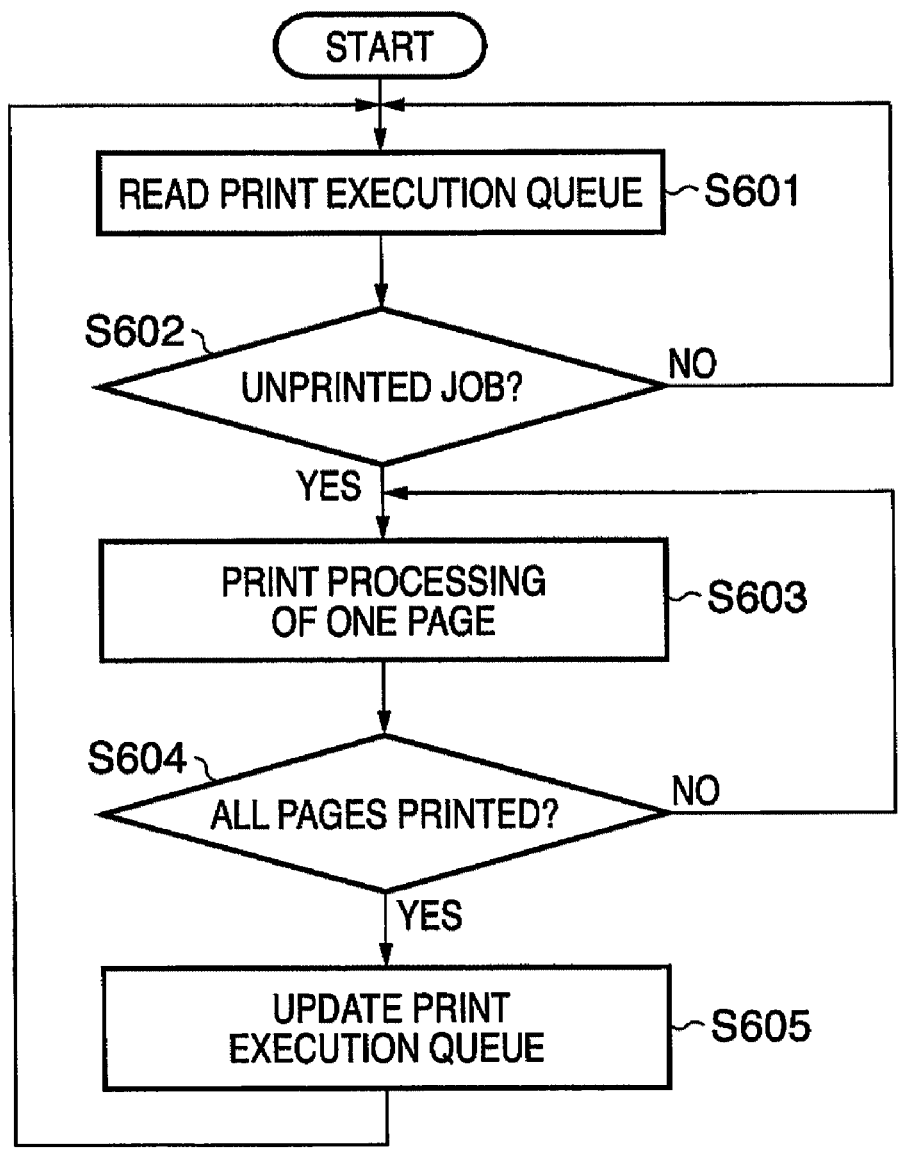
FIG. 19 is a flowchart illustrating a print process procedure with registration in the print execution queue according to the embodiment.

The process of the job controller 1600 as one of the process programs of the MFP controller 1000 will be described with reference to the flowchart in FIG. 19.

In step S601, the MFP controller 1000 reads the print execution queue. In step S602, the MFP controller 1000 determines whether an unprinted job exists. If NO in step S602, the process returns to step S601.

If the MFP controller 1000 determines that an unprinted job exists in the print execution queue, the process advances to step S603. In step S603, the MFP controller 1000 determines, on the basis of the job ID (to be described later) of the unprinted job, the location of corresponding image data, a box, image buffer, or hold queue, reads out the image data of one page, and executes the print processing. This process is repeated until the MFP controller 1000 determines in step S604 that all pages are printed.

If the MFP controller 1000 determines that all pages are printed, the process advances to step S605 to delete the print job ID and print job data of interest from the print execution queue. As will be described later, in test print, the MFP controller 1000 deletes the job ID from the print execution queue but not the print job data entity (and job management table).

On the other hand, various kinds of applications and a printer driver to use the MFP 100 of this embodiment are installed in the client PC 200 (FIG. 1).

Figure 5:
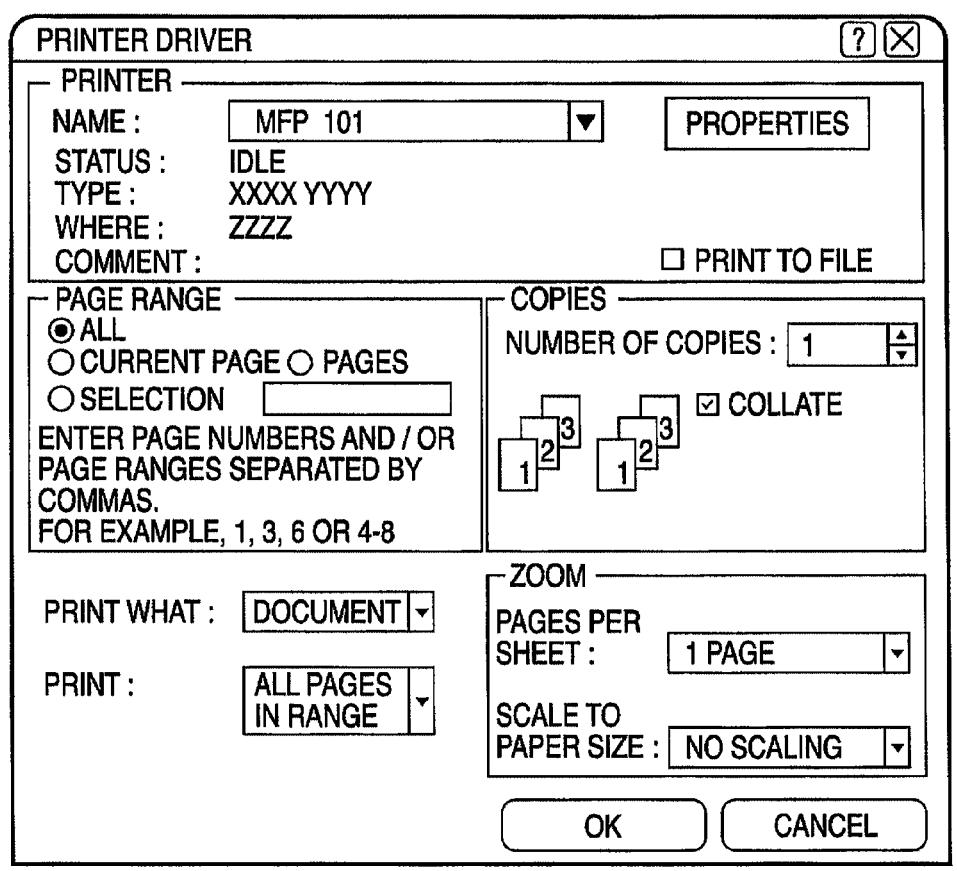
FIG. 5 is a view showing an example of the setup window of a printer driver executed by a host computer.

FIG. 5 shows an example of the print setup window of the printer driver of the client PC 200. When the user selects the print menu of a running application, the printer driver displays this window.

"Printer name" in the setup window has a pull-down list box. When the user selects a printer to be used by using a pointing device, "status" below displays the status of the print device, "type" displays the type of the printer driver, "where" displays installation location information of the print device, and "comment" displays comment information from a print device administrator. These pieces of information are obtained by issuing an information transfer request message to the corresponding printer when the print setup window is displayed, or the printer to be used is selected.

To output print data to a file without transmitting it to a print device, the user selects a "print to file" check box. Consequently, print data generated by the printer driver can be stored in a storage device of the client PC as a file.

"Page range" has radio buttons "all", "current page", "selection", and "pages" as items to select pages to be printed. The user selects one of the radio buttons (the default is "all"). When the user selects "pages", the edit box shifts to an input enable state. The user inputs the numbers of pages to be printed by using the keyboard.

The user can also select the attribute of the print target document by using a "print what" pull-down list box. The user can designate, in a "print" pull-down list box, whether to print all pages or only odd- or even-numbered pages.

In "copies", the user can set the number of copies to be printed. The user inputs the number of copies to be printed in the "number of copies" spin box. To print a plurality of copies not page by page but copy by copy, the user selects a "collate" check box.

In "zoom", the user can designate N-up printing (printing of laying out N pages on one print surface) from a "pages per sheet" pull-down list box. The user selects a paper size to the document size from a "scale to paper size" pull-down list box.

The user presses a "properties" button to set more detailed print attributes.

At the end of setting in the printer driver setup window, the user presses an "OK" button to cause a print device such as an MFP to print the print data or output it to a file. To stop printing or file output, the user presses a "cancel" button.

Figure 6:
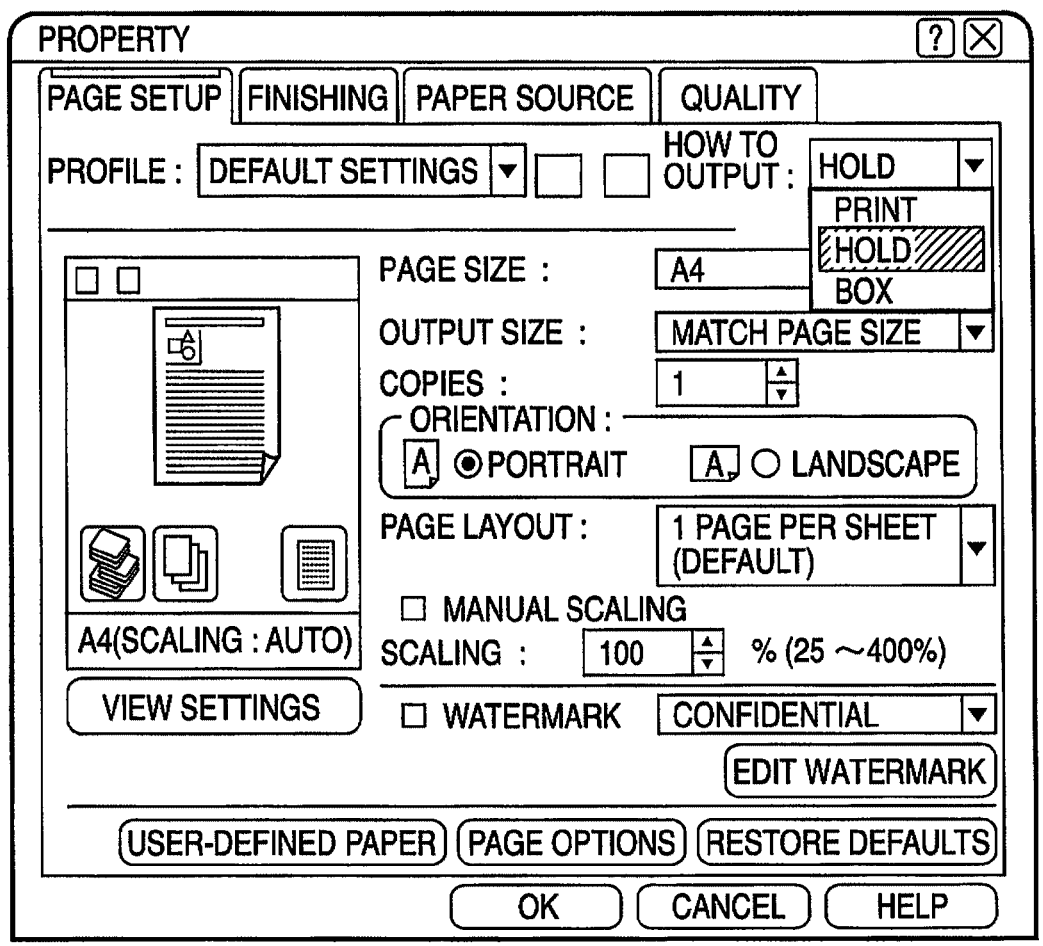
FIG. 6 is a view showing an example of the property setup window of the printer driver executed by the host computer.

FIG. 6 shows an example of a setup window which is displayed when the user indicates the "properties" button on the window in FIG. 5 by using a pointing device. The setup window has a plurality of tabs. In the initial state, the "page setup" tab is selected.

In a "profile" pull-down list box, the user selects optimal page settings from predetermined page setting modes. The user can add or edit a profile option with two buttons located on the left.

When the CPU of the client PC detects that a "view settings" button is pressed, the print image of the first page is displayed in the page image area displayed above the "view settings" button in accordance with the contents set in the property set up window.

In a "how to output" pull-down list box, the user selects an output method by determining whether to cause a print device such as an MFP to execute normal printing, save print data in the hold queue (hard disk) of the print device, or save print data in a box (hard disk) (a box is equivalent to a folder).

When the user designates "hold queue", the printer driver generates print data with a job ticket representing the hold queue and outputs the data. Upon receiving this print data, the MFP controller 1000 generates a print image and stores each page in the hold queue. That is, the MFP 100 does not execute the print processing at this point of time. The print processing starts when the MFP controller 1000 determines that a print instruction is received from the operation unit 1008.

When the user designates "box", the printer driver displays a selection menu to cause the user to select a box. Since the box names are managed as number sequences, a text area to input a number sequence may be displayed. The printer driver generates a job ticket containing information representing that the box function is used and information that specifies the box, generates print data containing the job ticket, and outputs it. Upon receiving the print data, the MFP controller 1000 generates a print image and stores each page in the designated box. That is, the MFP 100 does not execute the print processing at this point of time. The print processing starts when the MFP controller 1000 determines that a print instruction is received from the operation unit 1008.

The user selects a print target page size and an output paper size of the print device in a "page size" pull-down list box and "output size" pull-down list box.

The user inputs the number of copies to be printed to a "copies" spin box and selects the direction of output sheets of the print device from "portrait" and "landscape" of an "orientation" radio button.

The user designates N-up printing (printing of laying out a plurality of pages on one print surface) from a "page layout" pull-down list box. When selecting a "manual scaling" check box, the user can input the scaling ratio in units of % into a "scaling" spin box.

When selecting a "watermark" check box, the user can select a predetermined watermark type from a pull-down list box. By pressing an "edit watermark" button, the user can add or edit a watermark type.

The user can define paper by pressing a "user-defined paper" button. The user can set detailed page options by pressing a "page options" button. The user can return the various setting contents to defaults by pressing a "restore defaults" button.

At the end of setting in the printer driver property setup window, the user presses an "OK" button. Upon detecting that the "OK" button was pressed, the printer driver reflects these print attributes on actual printing. To stop settings in the property setup window, the user presses a "cancel" button. A "help" button displays a help window for the property setup window.

Upon detecting that the user has pressed the "OK" button in FIG. 5, the CPU of the client PC receives data transferred by an application and generates print data containing a job ticket and PDL data. Then, the OS (Operating System) of the client PC transfers the print data to the MFP 100 of the embodiment as a print job.

Figure 7:
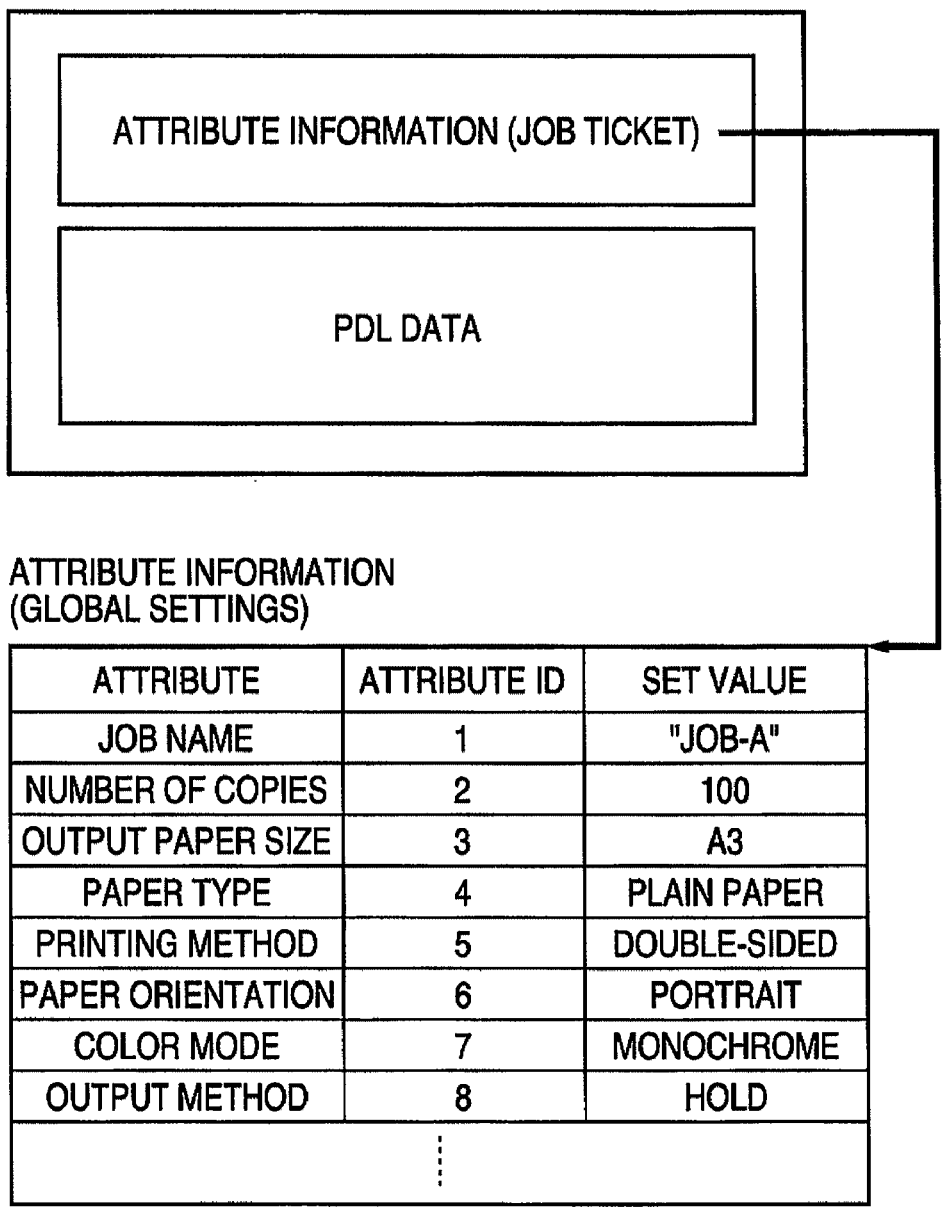
FIG. 7 is a view showing the structure of job data generated by the printer driver.

FIG. 7 shows the data structure of a print job transferred to the MFP 100. The print job data contains attribute information (job ticket) and PDL data.

The attribute information (global settings) stores the attribute IDs and set values of attributes such as "job name", "number of copies", "output size", "paper type", "printing method", "paper orientation", and "color mode". The attribute information is described in a format such as XML.

In the example shown in FIG. 7, attribute information (exceptional settings) stores "start page" and "end page" information as "application range", and the attribute IDs and set values of attributes such as "job name", "number of copies", "output size", "paper type", "printing method", "paper orientation", "color mode" and "output method". A set value according to the settings in the driver setup window or property setup window is set for each attribute. The output method indicates "hold".

Figure 8A:
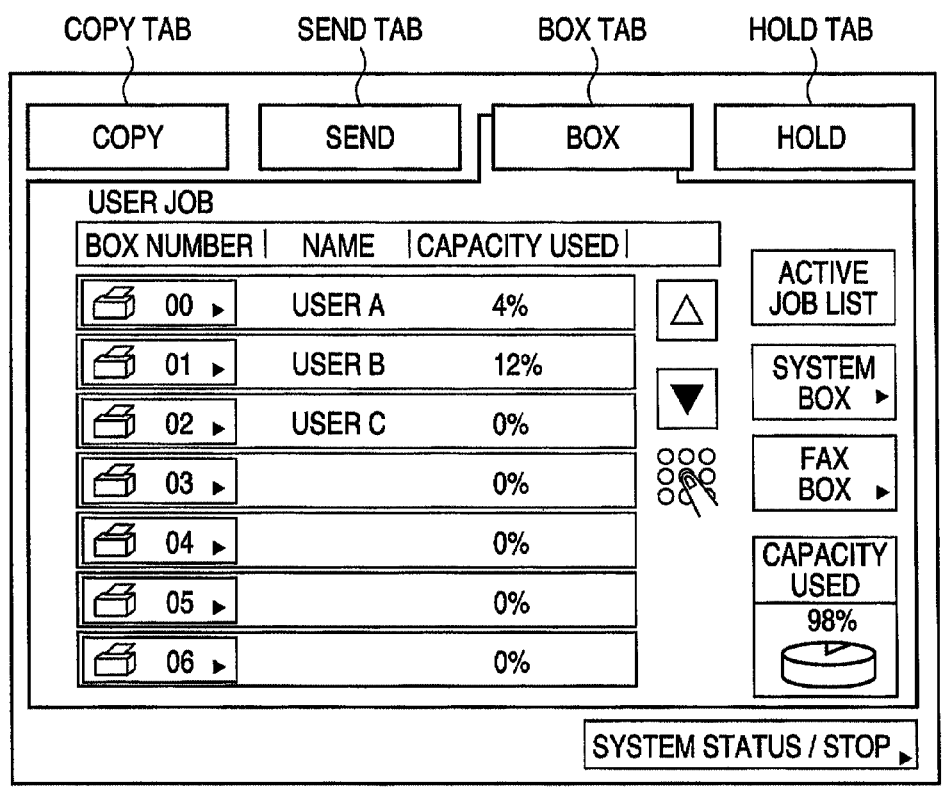
FIGS. 8A and 8B are views showing a box tab display example of an MFP touch panel unit according to the embodiment.

The operation unit 1008 of the MFP 100 according to the embodiment will be described next. FIG. 8A shows an example of a window displayed on the display unit of the operation unit 1008 of the MFP 100.

The operation unit 1008 according to the embodiment uses a touch panel. The window shown in FIG. 8A has tabs corresponding to functions. In this embodiment, "copy", "send", "box", and "hold" tabs are present. FIG. 8A shows a state wherein the "box" tab is active. This display window is called a box tab main window.

The box tab main window displays a list of boxes allocated in the HDD 1500. This display process is performed by causing the MFP controller 1000 to refer to the HDD 1500 and outputting the result to the operation unit 1008. The information of each box contains a box number, name, and capacity used. Upon detecting the button of a box desired by the user was touched on the operation unit 1008, the MFP controller 1000 displays the job list window of the box.

Figure 8B:
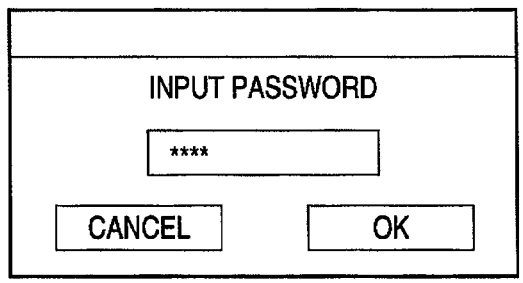

It is possible to set a password for each box. If a password is set, a password input window pops up, as shown in FIG. 8B. When the user inputs a correct password, the job list window is displayed. The password is input using number keys provided on the operation unit 1008. The password may be input using a touch keyboard displayed on the display screen.

Figure 9:
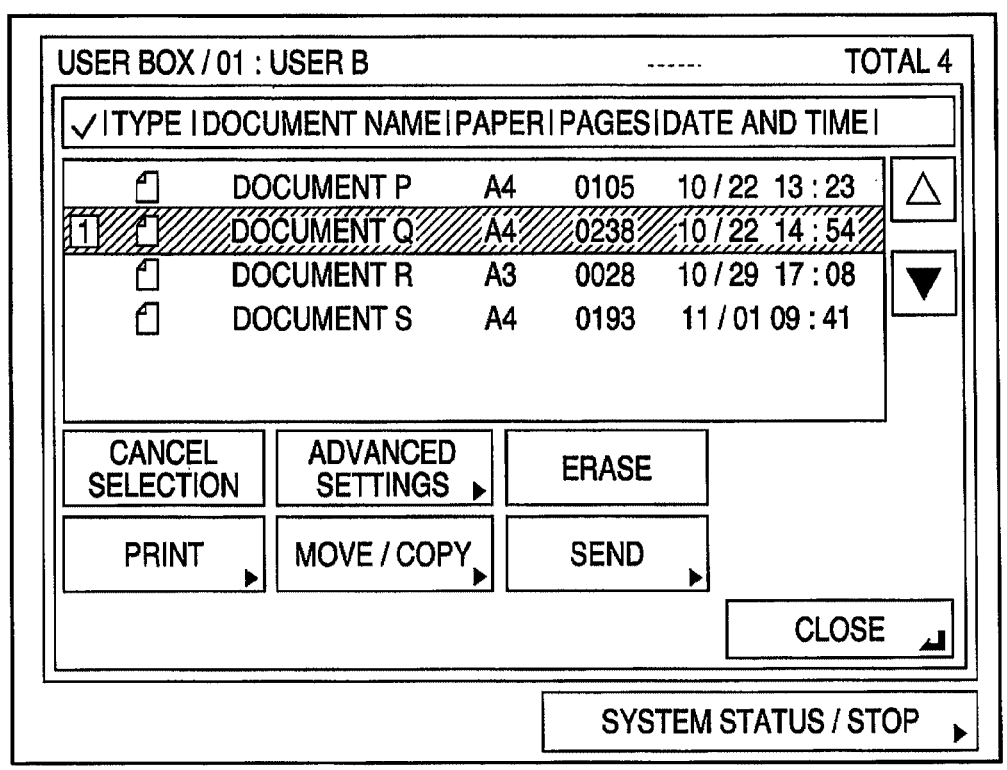
FIG. 9 is a view showing a display example of the list of jobs registered in a selected box.

FIG. 9 shows a job list display window that is displayed when the user touches box number 01 in the display window shown in FIG. 8A. "Type", "document name", "paper (size)", "page (total number of pages)", and "date and time (job storage date and time)" are displayed as the information of each job.

The user touches one of buttons provided on the low side of the window in correspondence with a displayed desired job, thereby requesting the MFP 100 to execute a corresponding process.

The user can select a job by touching the line where the job is displayed. The user can select a plurality of jobs. If a plurality of jobs are selected, the selection order can be recognized by numbers on the left side of the jobs. To select a plurality of jobs and input a print instruction, the user selects jobs to be printed and touches a "print" button. As a result, the print processing starts in accordance with the selection order. Job operation buttons include "advanced settings", "erase", "print", "move/copy", and "send". When the user presses the "advanced settings" button, the detailed information of a corresponding job is displayed. The print settings are displayed in the job list. When the user presses the "erase" button, the corresponding job is erased. When the user presses the "print" button, printing of the corresponding job starts. When the user presses the "send" button, a window to sent the corresponding job by e-mail is displayed. The user presses a "cancel selection" button to cancel selection.

FIGS. 10A to 10D are views showing changes in the box tab window. When it is detected that the user selects one box in the main window (box list display) shown in FIG. 10A, and a password is set for the box, the MFP controller 1000 displays the password input window in FIG. 10B (FIG. 8B) and waits for password input by the user. If the input password is correct, or no password is set for the selected box, the MFP controller 1000 displays the box job list window in FIG. 10C (described above in detail with reference to FIG. 9). When the user selects a job, and touch on the "print" button is detected, the MFP controller 1000 displays a print window in FIG. 10D. Upon detecting touch on a "print" button in the print window in FIG. 10D, the MFP controller 1000 starts printing the corresponding job and returns the display window to FIG. 10A. That is, when the user touches the "print" button in FIG. 10D, the display state is not maintained. This is because an individual sometimes stores a confidential document by setting a password. With the above process, the user who has input a print start instruction can leave the MFP 100 without any problem because the MFP 100 never displays the window in FIG. 10C unless an authentic password is input.

Figure 11:
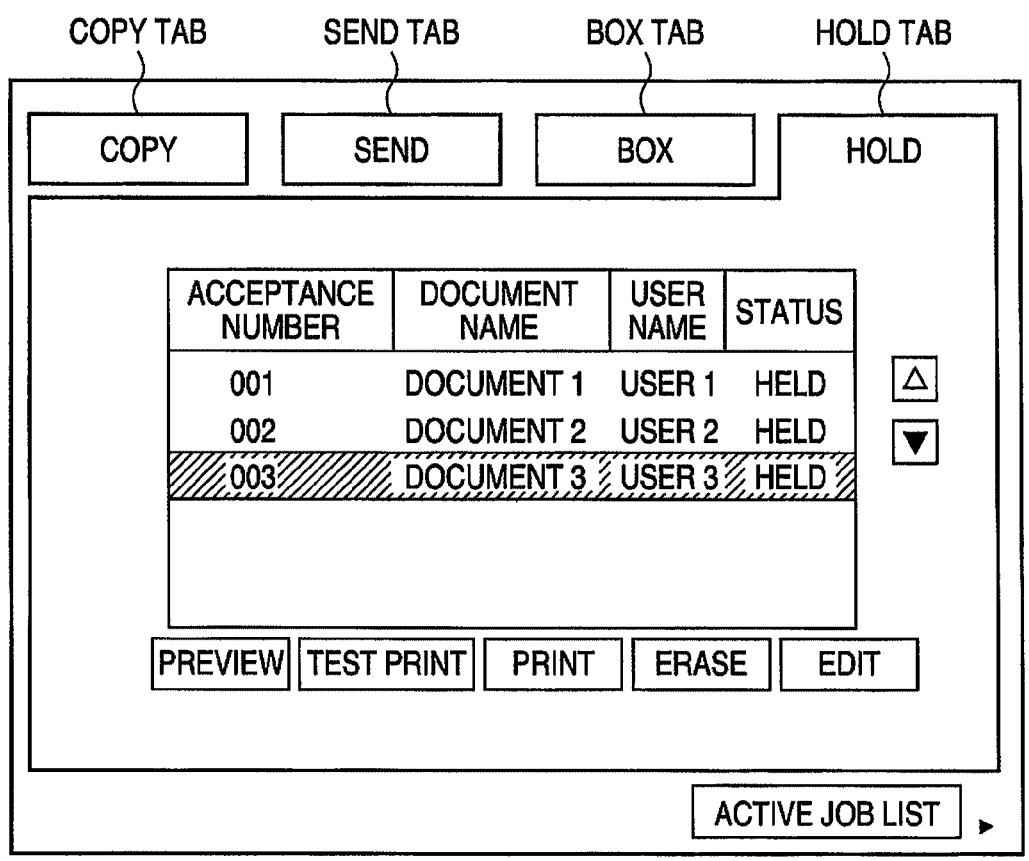
FIG. 11 is a view showing a hold tab display example of the MFP touch panel unit according to the embodiment.

FIG. 11 shows a display window (hold tab main window) that is displayed when the user touches the "hold" tab in FIG. 8A. In other words, when the user touches the "hold" tab, the MFP controller 1000 controls the operation unit 1008 so as to display the main window. At this time, the MFP controller 1000 reads out job information from a folder dedicated to a hold queue preset in the HDD 1500 and displays a list, as shown in FIG. 11.

Only one hold queue exists in the HDD 1500 without password setting, unlike the boxes, and is used to temporarily store jobs. The window displays "acceptance number", "document name", "user name", and "status" as the information of each job stored in the hold queue. "Status" indicates the process status of a job. In the hold queue, the statuses include "held" indicating a held state and "stored" indicating that data is stored.

The user can select one or a plurality of jobs. After selecting a job, the user touches a button on the lower side of the window to execute a corresponding job operation. Operation types are "preview", "test print", "print", "erase", and "edit". "Preview" displays a preview of the corresponding job. "Test print" prints only one copy of the corresponding job. "Print" prints the corresponding job. "Erase" erases the corresponding job. "Edit" changes the settings of the corresponding job.

FIG. 12A shows a hold job list window (main window) that is displayed when the user touches the hold tab. When the user selects a target job in this window, and it is then detected that the user touches the "print" or "test print" button, the MFP controller 1000 starts the print processing (more exactly, registers the job in the print execution queue) and displays a window (active job list window) shown in FIG. 12B. FIG. 12B shows the print execution queue.

In the example shown in FIG. 12A, the user instructs to print the job with acceptance number "003". Hence, FIG. 12B shows that the job is registered at the end of the print execution queue.

Figure 4:
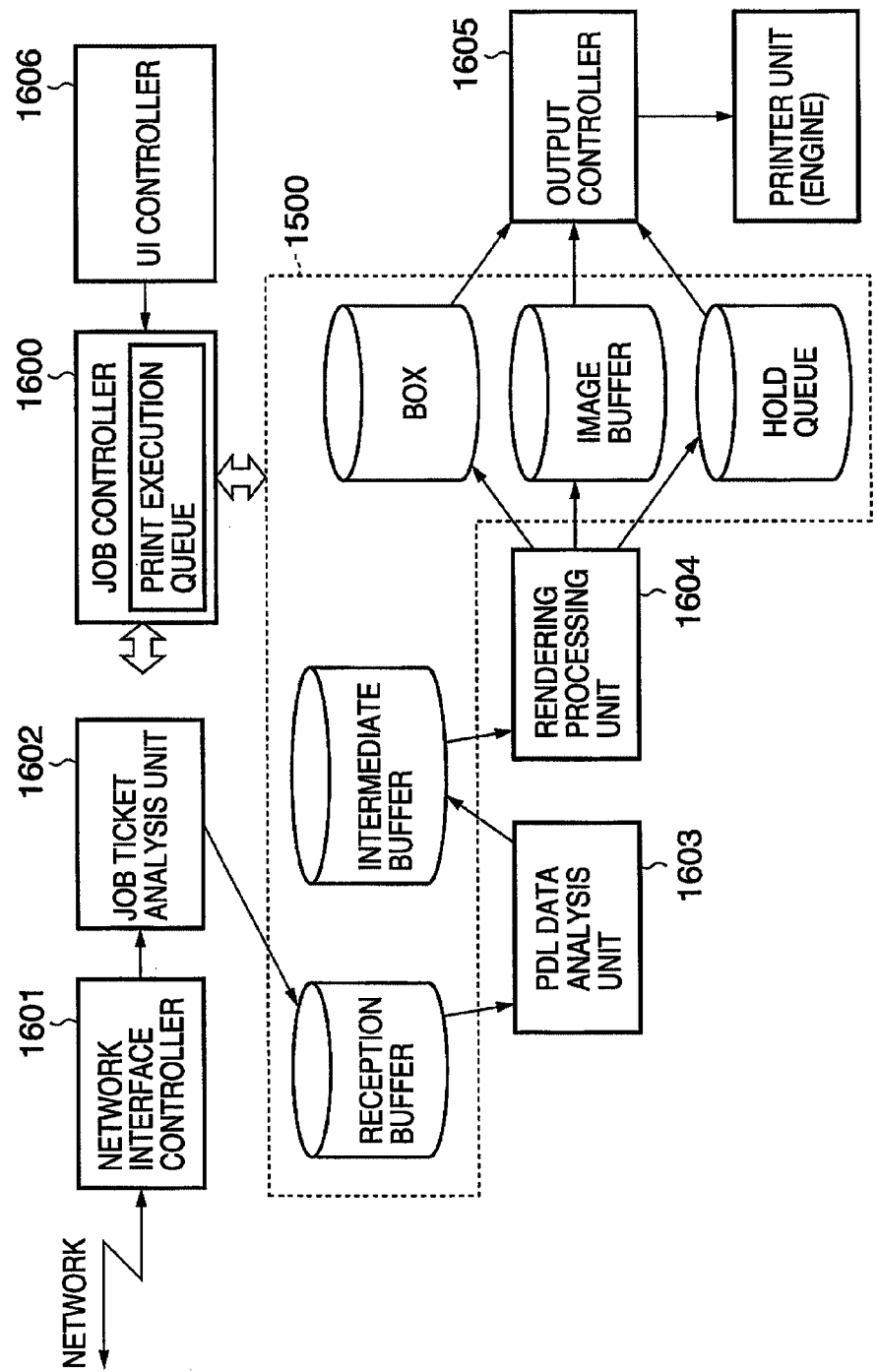
FIG. 4 is a block diagram showing the arrangement of firmware which implements the process of an MFP controller according to the embodiment.

The job list displayed in the job list window in FIG. 12B includes jobs print-instructed from the boxes in FIG. 4, jobs print-instructed from the image buffer, and jobs print-instructed from the hold queue, as described above. That is, all jobs the MFP 100 is instructed to print are displayed.

"Acceptance number", "document name", "user name", "status", and "predicted time" are displayed as the information of each job. "Status" indicates the process status of a job. The statuses include "print" indicating that the print processing on paper is progressing and "standby" indicating that a job is in the queue and waits for the print processing. "Predicted time" indicates the time predicted until the completion of printing of a job and is calculated based on information such as the number of pages. In this embodiment, each page of a print-instructed job is already converted into image data, as is apparent from FIG. 4. For this reason, the predicted waiting time for printing can be calculated based on the processing capability (printer engine) of the printer unit (the number of pages printed per unit time) and the number of pages of each job.

The window shown in FIG. 12B has "priority print", "erase", "advanced settings", and "pause" buttons. When the user touches the "priority print" button, an instruction to move up the selected job in order as much as possible is input. If the job on the uppermost line is being printed now, the selected job moves up to the next (second) position.

When the user touches the "erase" button, the print processing of the job is canceled, and the job is erased from the list. In other words, upon detecting that the "erase" button was touched, the MFP controller 1000 deletes the job and reflects the result on the display window of the operation unit 1008.

When the user touches the "advanced settings" button, the settings of the job are displayed. When the user touches the "pause" button, the process of the job is paused. The "pause" button is a toggle and switches between the paused state and the standby state every time the user touches it. When the user touches a "hold job list" button, the display returns to the window in FIG. 12A.

The hold queue temporarily stores jobs. Without password setting, the hold queue is handled like a shared folder. Hence, anyone can store jobs in the hold queue. In some cases (depending on a workflow in a workplace), a job is always stored in the hold queue, and after confirming the state of, for example, paper sheets set in the device, printing is started. In this case, the user may want to confirm both each job status in the hold queue and the status of a job that is being printed. Actually in the commercial printing industry, some printer controllers with a large display screen display both statuses simultaneously. However, most image forming apparatuses cannot display both windows simultaneously because of a small display size, or can display only several lines at once and have poor visibility.

In this embodiment, when the print operation is executed in the window shown in FIG. 12A (when the "test print" button or "print" button was touched), the list of jobs currently under the print processing in FIG. 12B is displayed automatically.

The window in FIG. 12B automatically selects and displays a job for which printing is executed. The user can immediately execute a job operation (e.g., "priority print" or "pause") for the job.

If a job is selected in the window in FIG. 12A, and the window in FIG. 12B is kept displayed, the user cannot know the process status of the job after printing. If a dedicated button to display the window in FIG. 12B is prepared, the number of times of operations increases, resulting in cumbersomeness. In this embodiment, however, the window in FIG. 12B can automatically be displayed only by selecting a job and inputting a print instruction. Hence, the user can grasp the turn of the selected job. In this state, the user can also grasp an approximate time necessary for completing printing.

When a job is selected in the window in FIG. 12A, and print instruction input is detected, the MFP 100 executes the following process.

Each job registered in the active job list is expressed by a variable i (i=1, 2, 3, . . . ) The number of unprinted pages of each job is expressed by P(i). P(i) indicates the total number of unprinted pages of a job i. More specifically, total number of unprinted pages=number of unprinted pages of document× number of copies to be printed. The print capability of the printer unit, that is, the number of pages printed per unit time (1 min in this embodiment) is expressed by V.

In this case, a waiting time T(k) for completion of printing of the kth job is given by $$T(k)=\Sigma P(i)/V$$

where $\Sigma$ is the sum function of variables i=1, 2, 3, . . . , k.

The MFP controller 1000 calculates the predicted waiting time for completion of printing of each job by executing the above calculation for each job registered in the active job list and displays the result.

Even when the window in FIG. 12B is being displayed, the MFP controller 1000 executes the above process at an appropriate time interval. In this embodiment, the time interval is 1 min. In the above example, a relative time from the current time is displayed. However, a print completion time may be displayed by adding the time to the current time.

Figure 13:
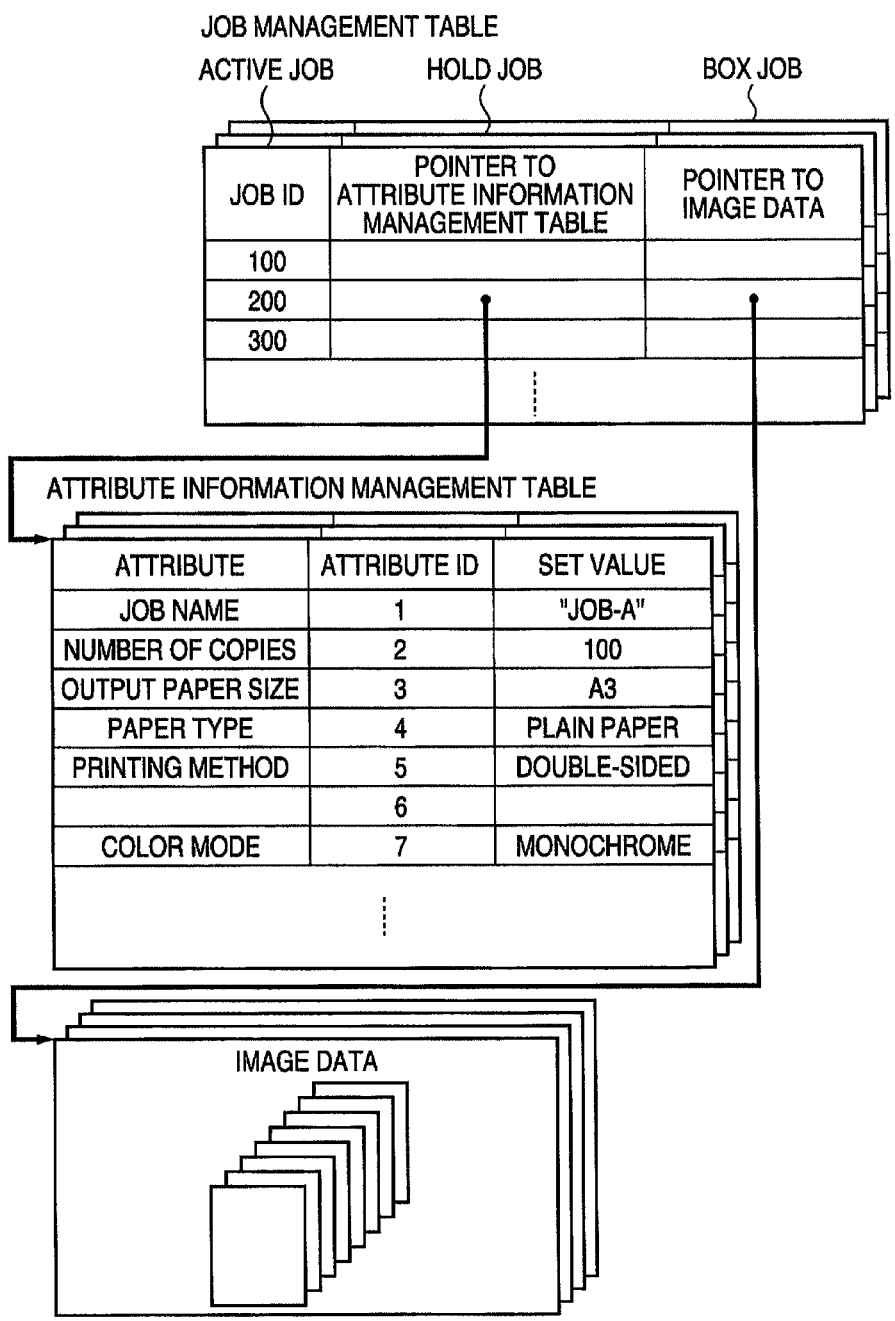
FIG. 13 is a view showing a job management table managed by the MFP controller according to the embodiment.

FIG. 13 shows a table to manage jobs in image forming apparatus. This table is held in the HDD 1500.

The job management table includes job IDs, pointers to an attribute information management table, and pointers to image data. A job ID is issued by the MFP controller 1000 to manage a job.

The job management table includes a table for active jobs, a table for hold jobs, and a table for box jobs.

The attribute information management table stores the attribute of each job and includes the attribute ID and set value of each job. Image data is managed for each job and for each page.

The process procedure of the MFP controller 1000 according to the embodiment will be described next with reference to the flowcharts in FIGS. 14 to 18.

Figure 14:
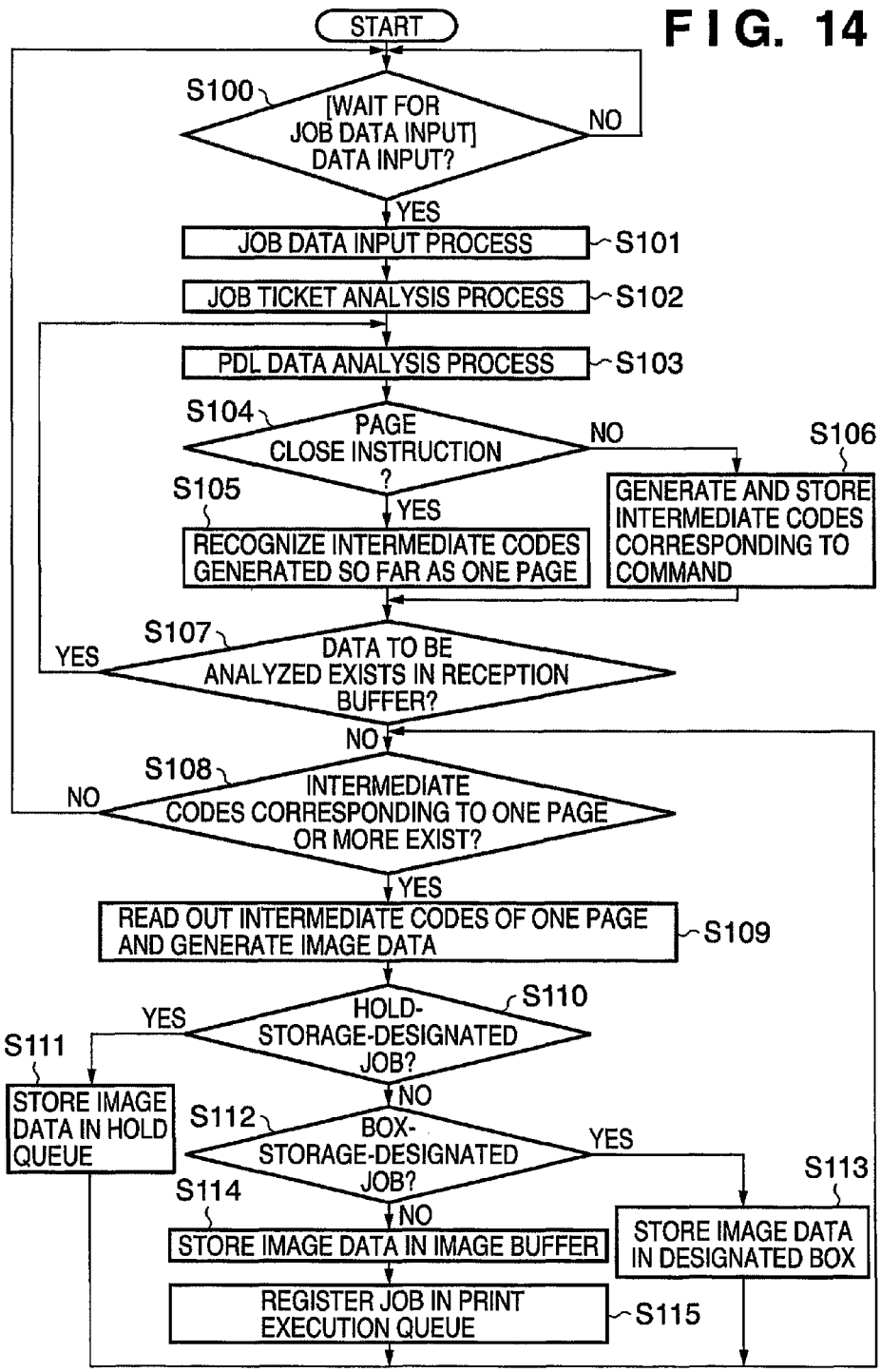
FIG. 14 is a flowchart illustrating the main process of the MFP controller according to the embodiment.

FIG. 14 illustrates the main process of the MFP controller 1000 according to the embodiment.

When the apparatus is powered on, the MFP controller 1000 waits for reception of print job data in step S100. When the MFP controller 1000 detects reception of print job data, the process advances to step S101 to input the print job data. The process in steps S100 and S101 is also the process of the network interface controller 1601 executed by the MFP controller 1000.

The MFP controller 1000 advances the process to step S102 and executes the process of the job ticket analysis unit 1602 to analyze the received print job data. After the analysis, the MFP controller 1000 stores the print data (PDL data) in the reception buffer of the HDD 1500. The MFP controller 1000 also analyzes the job ticket and determines which process should be executed for the job: hold, box, or normal printing. For hold, the MFP controller 1000 registers the job in the job management table for hold. For box, the MFP controller 1000 registers the job in the job management table for a box with a designated box number. For normal printing, the job will directly be registered in the print queue. Hence, the MFP controller 1000 registers the job in the active job management table.

The MFP controller 1000 advances the process to step S103 and analyzes the PDL data stored in the reception buffer (the PDL data analysis process will be described later in detail). In step S104, the MFP controller 1000 determines whether the command is a page close command (also determines whether the command indicates an end of one page). If the command is a page close command, the MFP controller 1000 recognizes intermediate codes generated so far as the data of one page (step S105). The intermediate codes are managed for each page, as described above.

If the MFP controller 1000 determines in step S104 that the command is not a page close command, the process advances to step S106 to generate intermediate codes having a format suitable for an internal process in accordance with the command.

In step S107, the MFP controller 1000 checks whether data to be analyzed exists in the reception buffer. If the MFP controller 1000 determines that data to be analyzed exists, the process returns to step S103 to repeat the PDL data analysis process. If the MFP controller 1000 determines that no data to be analyzed exists in the reception buffer, the process advances to step S108.

In step S108, the MFP controller 1000 checks whether intermediate codes corresponding to one page or more exist. If the MFP controller 1000 determines that intermediate codes corresponding to one page or more exist, the process advances to step S109 to read out intermediate codes of one page from the intermediate buffer and generates image data (bitmap) from the intermediate codes.

In step S110, the MFP controller 1000 determines whether the job is hold-designated. If the job is hold-designated, the MFP controller 1000 advances the process to step S111 to store the generated image data in the hold queue allocated in the HDD.

If the MFP controller 1000 determines that the job of interest is not hold-designated, the process advances to step S112. In step S112, the MFP controller 1000 determines whether the job of interest is box-storage-designated. If the job of interest is box-storage-designated, the MFP controller 1000 advances the process to step S113 to store the image data in the box designated by the job ticket.

If the MFP controller 1000 determines that the job of interest is a job (normal print job) that is not box-storage-designated, the process advances to step S114 to store the image data of one page in the image buffer. If the page stored in the image buffer is the first page of the normal print job, the MFP controller 1000 registers the job ID in the print execution queue in step S115.

If any other job is not undergoing the print processing; that is, if the job is registered at the top of the print execution queue, a process of reading out the image data of one page from the image buffer, converting the image data into a video signal, and transferring the video signal to the printer unit (engine) starts. The printer unit will execute printing on actual paper on the basis of the video signal and discharge the printed paper sheet to the outside.

Transfer to the printer unit and the storage process in the image buffer do not synchronize. Normally, conversion to image data is executed quicker than printing by the printer unit. Hence, the amount of image data in the image buffer from unprinted pages gradually increases.

After the process in step S115, the MFP controller 1000 returns the process to step S108. If intermediate codes corresponding to one page are not generated yet, the process returns to step S101 to wait for subsequent input data.

Figure 15:
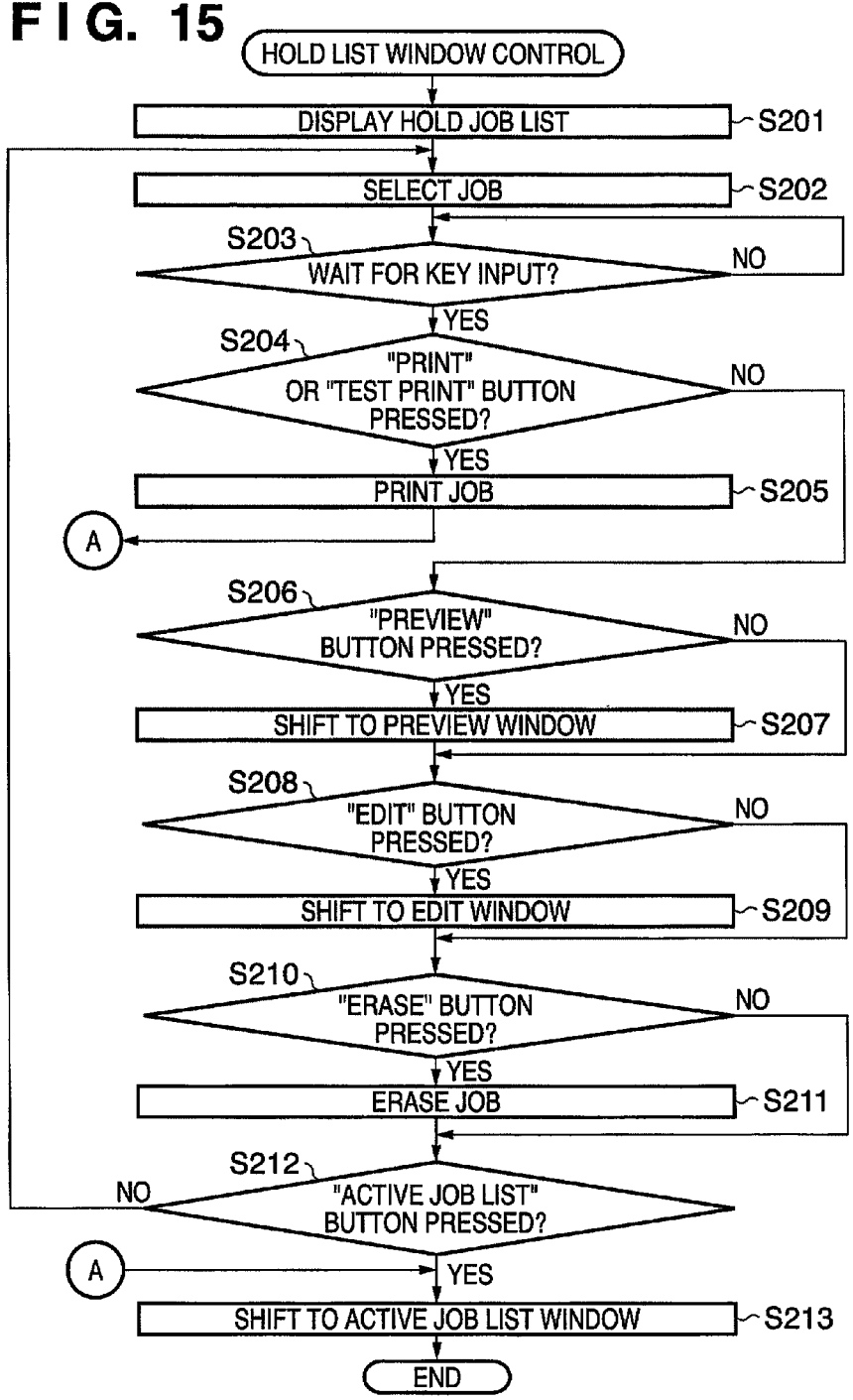
FIG. 15 is a flowchart illustrating a hold list display process executed by the MFP controller according to the embodiment.

FIG. 15 is a flowchart illustrating a hold list display process executed by the MFP controller and a process according to input to the touch panel by the user. The MFP controller 1000 executes the process shown in FIG. 15 as a task distinct from the main process in FIG. 14.

In step S201, the MFP controller 1000 displays the list of hold jobs stored in the hold queue in accordance with the information in the hold job management table.

In step S202, the MFP controller 1000 waits for job selection. As described above, the user can select one or a plurality of jobs from the displayed list. In the initial state, the job at the top of the list is highlighted.

The MFP controller 1000 advances the process to step S204 to wait for key input. When the MFP controller 1000 detects key input, the process advances to step S204.

In step S204, the MFP controller 1000 determines on the basis of user's touch position information from the operation unit 1008 whether the "print" button or "test print" button was touched (this will simply be expressed as "the MFP controller 1000 determines whether the "xxxx" button was touched" hereinafter).

Upon detecting touch of the "print" or "test print" buttons, the MFP controller 1000 advances the process to step S205 to start the print processing of the job. The MFP controller 1000 advances the process to step S213 to display the active job list window. In test print, the MFP controller 1000 executes the print processing of only one copy independently of the actual number of copies set for the job.

If the MFP controller 1000 determines in step S204 that neither the "print" button nor the "test print" button was touched, the process advances to step S206.

In step S206, the MFP controller 1000 determines whether the "preview" button was touched. If the MFP controller 1000 determines that the "preview" button was touched, the process advances to step S207 to display the preview window of the first page of the job.

In step S208, the MFP controller 1000 determines whether the "edit" button was touched. If the MFP controller 1000 determines that the "edit" button was touched, the process advances to step S209 to display a job ticket editing window. If the MFP controller 1000 determines that a button other than the "edit" button was touched, the process advances to step S210.

In step S210, the MFP controller 1000 determines whether the "erase" button was touched. If the MFP controller 1000 determines that the "erase" button was touched, the process advances to step S211 to delete the selected job. More specifically, the MFP controller 1000 deletes the corresponding data from the hold job management table and erases the image data in the hold queue.

In step S212, the MFP controller 1000 determines whether the "active job list" button was touched. If the MFP controller 1000 determines that the "active job list" button was touched, the process advances to step S213 to display the active job list window (the window shown in FIG. 12B).

Figure 16:
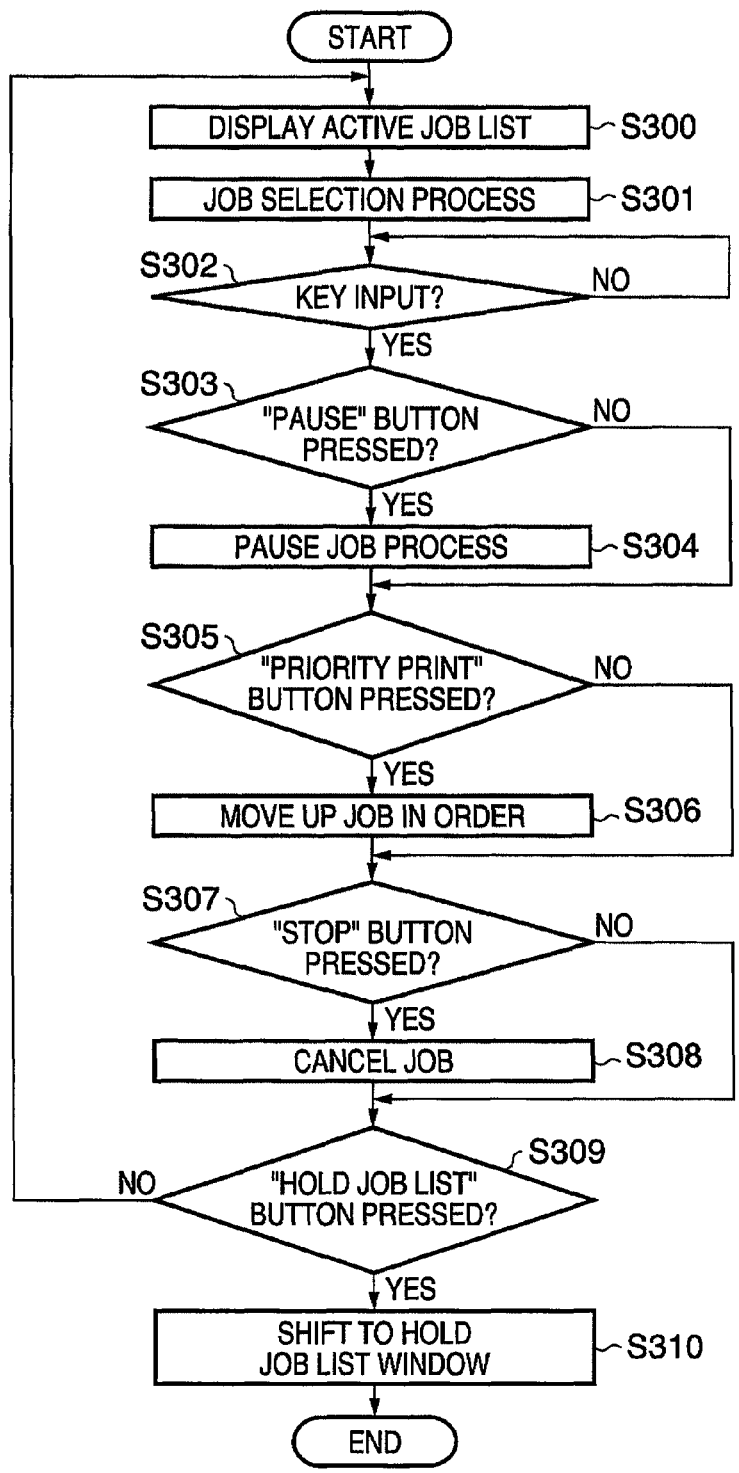
FIG. 16 is a flowchart illustrating an active job list display process executed by the MFP controller according to the embodiment.

FIG. 16 is a flowchart illustrating an active job list (FIG. 12B) display process and a process according to user input, which are executed by the MFP controller 1000.

In step S300, the MFP controller 1000 displays the active job list (FIG. 12B). At this time, the MFP controller 1000 refers to each job management table and calculates and displays the print completion time of each job in accordance with the number of unprinted pages and the number of copies of each of the active jobs registered in the print queue.

When the display process is ended, the MFP controller 1000 advances the process to step S301 to execute a process according to a user's job selection (e.g., by highlighting the selected job).

The MFP controller 1000 advances the process to step S302 to wait for touch (key input) of various displayed buttons. If the MFP controller 1000 determines that the operator has performed key input (in this embodiment, touch on the touch panel), the process advances to step S303.

In step S303, the MFP controller 1000 determines whether the "pause" button was touched. If the MFP controller 1000 determines that the "pause" button was touched, the process advances to step S304 to pause the print processing of the job. The job status indicates a pause state.

Note that if the selected job is already in the pause job state (displayed as "resume state"), and the MFP controller 1000 determines that the pause button was touched again, the pause state is canceled, and the process advances to step S305.

In step S305, the MFP controller 1000 determines whether the "priority print" button was touched. If the MFP controller 1000 detects touch of the "priority print" button, the process advances to step S306 to move up the selected job in order. Since it is impossible to pass the job that is currently being processed, the MFP controller 1000 moves the selected job to the top of the list of jobs which are awaiting printing on paper. After that, the MFP controller 1000 advances the process to step S307.

In step S307, the MFP controller 1000 checks whether the "stop" button was pressed. If the "stop" button was pressed, the process advances to step S308 to cancel the selected job.

In step S309, the MFP controller 1000 determines whether the "hold job list" button was touched. If the MFP controller 1000 detects touch on the "hold job list" button, the process advances to step S310 to display the hold job list window (the window shown in FIG. 11).

If it is determined in step S309 that a button other than the "hold job list" button was pressed, the MFP controller 1000 regards it as the end of key input, and the process returns to step S300. If the job print order is changed, the MFP controller 1000 executes step S300 again and updates the print completion time of each job.

Figure 17:
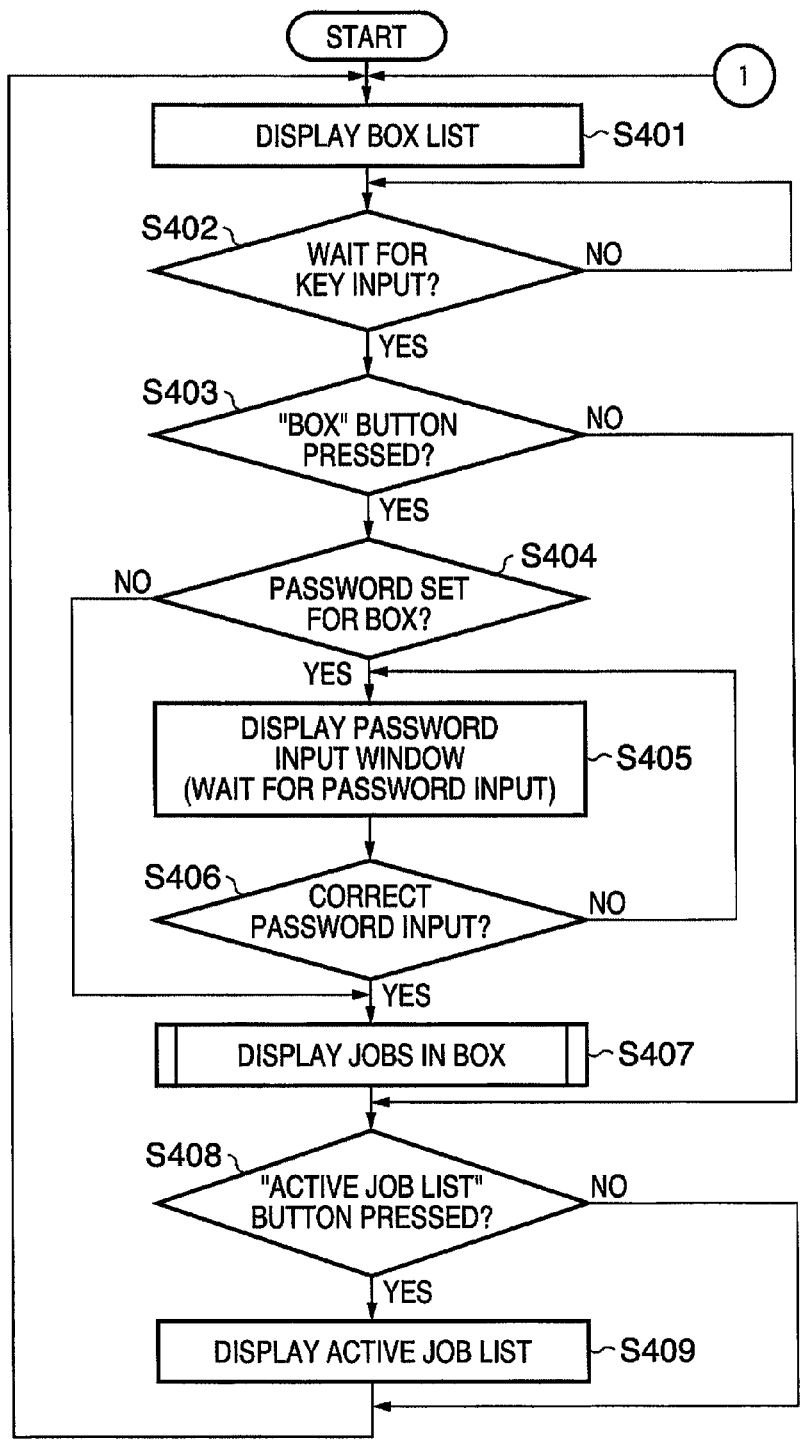
FIG. 17 is a flowchart illustrating a box list display process executed by the MFP controller according to the embodiment.
Figure 18:
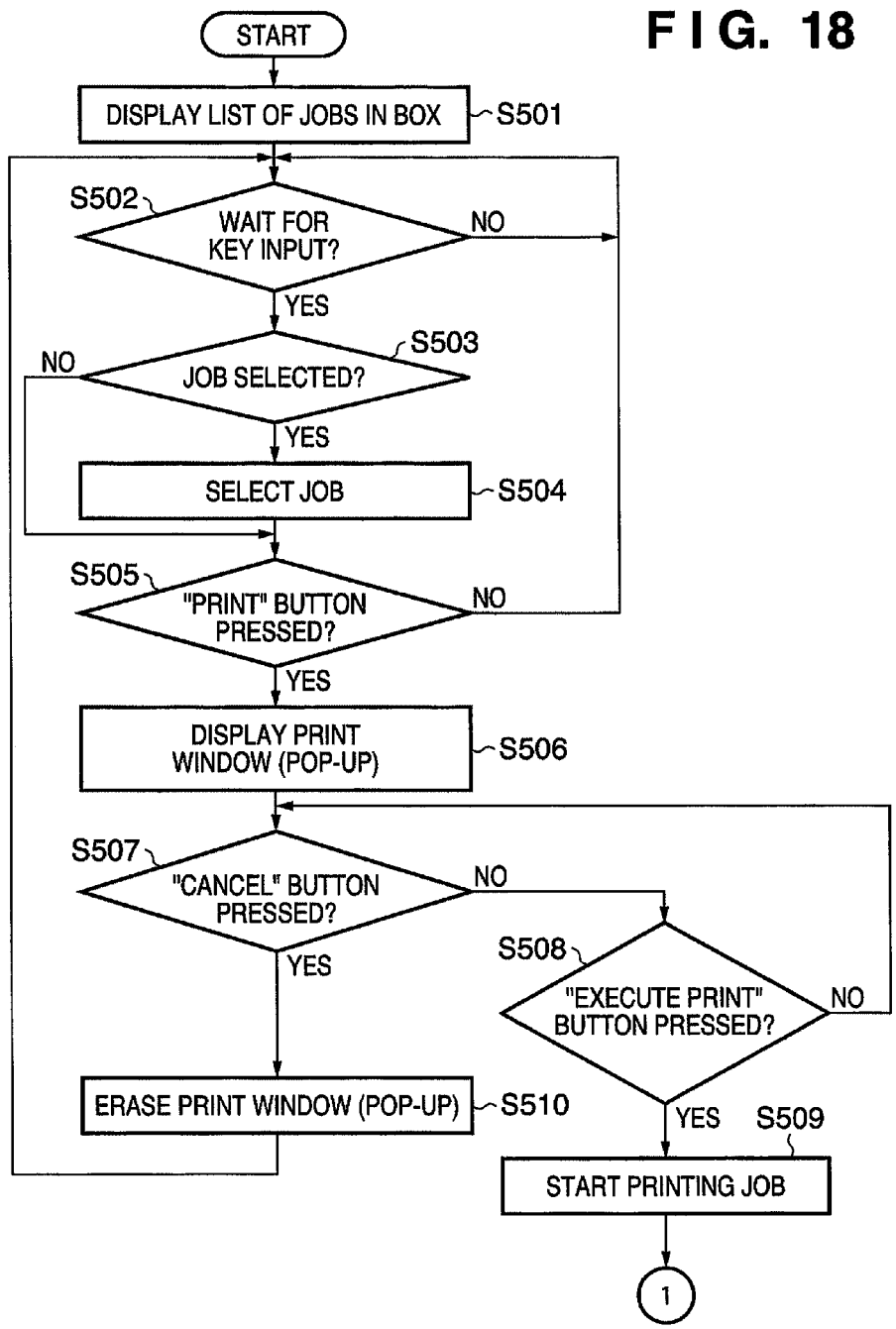
FIG. 18 is a flowchart illustrating a box job list display process executed by the MFP controller according to the embodiment.

FIGS. 17 and 18 are flowcharts illustrating a box list display process and a process according to user input. These flowcharts are related to control of the window shown in FIG. 8A.

In step S401, the MFP controller 1000 displays the box list. A box number, name, and capacity used are displayed as the information of each box. The name can be set by the user, and a detailed description thereof will be omitted herein.

The MFP controller 1000 advances the process to step S402 to wait for instruction input by the user.

In step S403, the MFP controller 1000 determines whether the user input indicates selection of a box button. In other words, the MFP controller 1000 determines which box is selected by the user.

If the MFP controller 1000 determines that a box button was touched, the process advances to S404 to determine whether a password is set for the selected box. If the MFP controller 1000 determines that no password is set for the box selected by the user, the process advances to step S407. If the MFP controller 1000 determines that a password is set for the selected box, the process advances to step S405 to display the password input window. In step S406, the MFP controller 1000 compares the password input by the user with the password set for the box and determines whether they match. Only upon determining that the passwords match does the process advance to step S407.

Note that a file representing the correspondence between a box and a password is saved in the HDD. The default of the password input area is null. When the password area is null, the MFP controller 1000 determines that no password is set for the box. If data other than null is stored, the MFP controller 1000 determines that a password is set.

In step S407, the MFP controller 1000 displays the list of jobs in the box (FIG. 9).

In step S408, the MFP controller 1000 determines whether the "active job list" button was touched. If the MFP controller 1000 detects touch of the "active job list" button, the process advances to step S409 to display the active job list (FIG. 12B). If the MFP controller 1000 detects touch at a position other than the "active job list" button, the process returns to step S401.

FIG. 18 is a flowchart illustrating a box job list display process and a process according to user input, which are executed by the MFP controller 1000.

In step S501, the MFP controller 1000 displays the list of jobs in the box selected by the user (FIG. 9).

The MFP controller 1000 advances the process to step S502 to wait for user input.

When the MFP controller 1000 detects user input, the process advances to step S503 to determine whether the input indicates a job selection instruction. To select a desired job, the user touches the line of the job. If it is determined that the user input indicates job selection, the process advances to step S504 to execute the job selection process. Information (in this embodiment, a job ID) to specify the selected job is stored in the RAM (not shown) of the MFP controller 1000. Additionally, the corresponding line is highlighted to explicitly indicate the selected job. When at least one job is selected, the MFP controller 1000 enables and displays the "print" button to receive input of the "print" button.

If the MFP controller 1000 determines that the user input does not indicate job selection, the process advances to step S505 to determine whether the "print" button was touched.

The presence/absence of touch on the "print" button is determined only when at least one job is selected, as described above.

If the MFP controller 1000 determines that a button other than the "print" button was touched or that none of jobs were selected, the process returns to step S502.

If the MFP controller 1000 determines that the "print" button was touched, the process advances to step S506 to display the print window (pop-up window).

In step S507, the MFP controller 1000 determines whether the "cancel" button was touched. If the MFP controller 1000 detects touch of the "cancel" button, the process advances to step S510 to erase the pop-up window, and the process returns to step S502.

If the MFP controller 1000 determines that the "cancel" button was not touched, the process advances to step S508 to determine whether the "execute printing" button was touched. If the MFP controller 1000 determines that a button other than the "execute printing" button was touched, the process returns to step S507.

If the MFP controller 1000 determines in step S508 that the "execute printing" button was touched, the process advances to step S509 to start the print processing of the selected job (register the job in the print queue), and the process returns to step S401 in FIG. 17.

The process procedure for a hold-designated job has been described above.

Setting of device adjustable parameters according to the embodiment will be described next. This setting process changes depending on whether a hold-designated job is registered in a storage device such as an HDD. Setting of device adjustable parameters "when a hold-designated job is not registered in a storage device such as an HDD" will be described first.

To change device adjustable parameters, the user presses an "initialize/register" button (not shown) on the operation panel. When the MFP controller 1000 detects this button press and determines that no hold-designated job is registered in the hold queue, an initialize/register window, as shown in FIG. 20A, is displayed on the display screen of the operation unit.

Figure 20D:
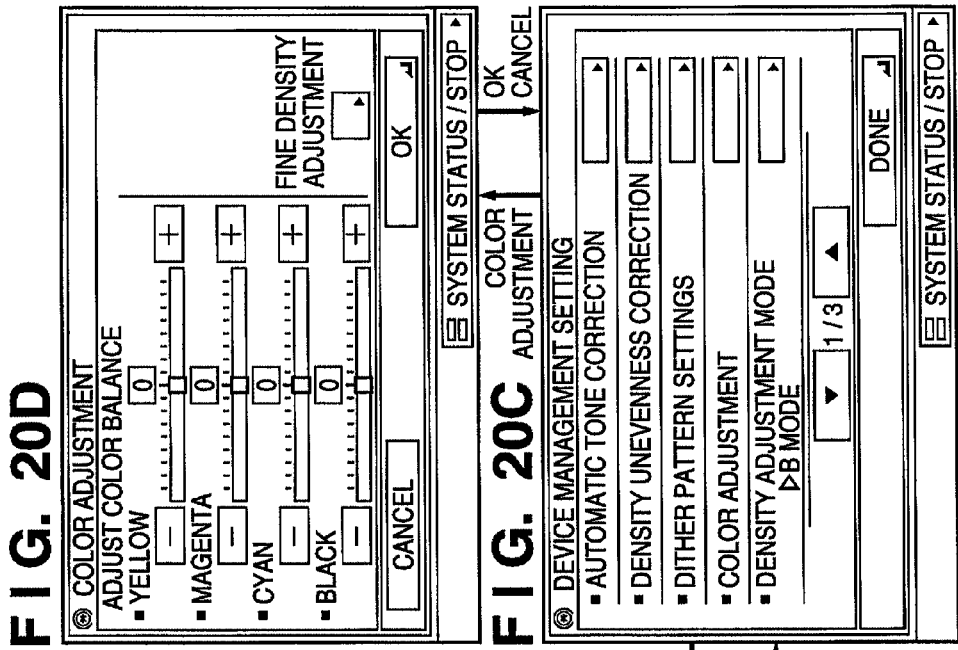
FIGS. 20A to 20D are views showing a device setting parameter display process executed by the MFP controller according to the embodiment.
Figure 20C:
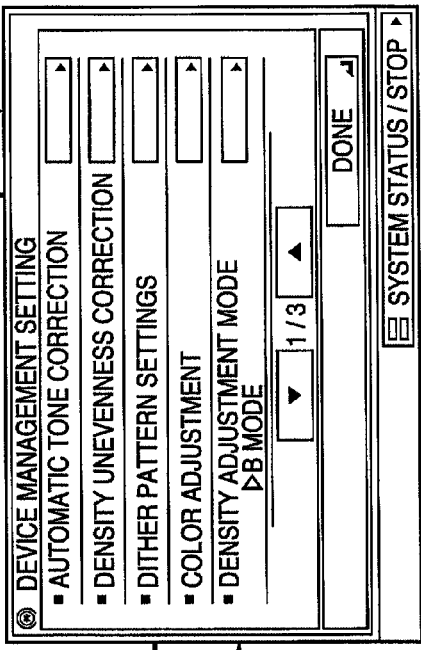
Figure 20A:
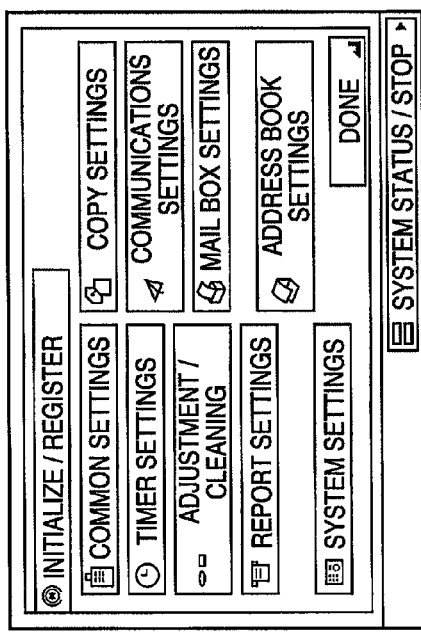

Referring to FIG. 20A, a "common settings" button sets specifications common to functions such as "copy", "box", "send", and "fax". A "timer settings" button finely adjusts the time or sets the time until a sleep state. An "adjustment/cleaning" button executes print image fine adjustment or cleaning. A "report settings" button outputs a printer information list or a test page. A "system settings" button executes settings, for example, for a system administrator who administers operations. A "copy settings" button sets specifications about copy. A "communications settings" button sets specification about transmission and reception. A "box setting" button sets specification about boxes. An "address book settings" button executes registration and deletion in an address book.

Figure 20B:
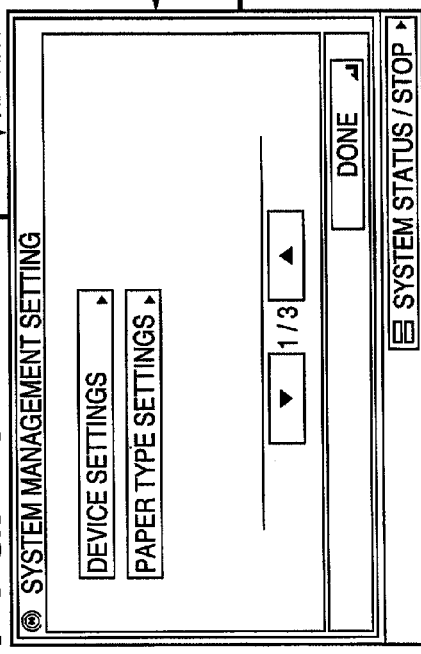

In the state shown in FIG. 20A, if the MFP controller 1000 detects that the "system settings" button was pressed, a system management setting window in FIG. 20B is displayed. Referring to FIG. 20B, a "device settings" button adjusts, for example, the tone, toner densities, colors, and image quality. A "paper type settings" button gives an arbitrary name to paper other than registered paper types and registers or edits it.

In the window display state in FIG. 20B, if the MFP controller 1000 detects that the "device settings" button was pressed, a device management setting window in FIG. 20C is displayed. Referring to FIG. 20C, an "automatic tone correction" button adjusts the tone, density, and tint of a copy different from the original document to obtain a correct image. A "density unevenness correction" button improves density unevenness that occurs in the halftone area of a print image. A "dither pattern settings" button changes data (dither pattern) as the base of a dot pattern to change the expression of a print image. A "color adjustment" button adjusts the color balance between yellow, magenta, cyan, and black or finely adjusts the initial value of the density of each color. A "density adjustment mode" button switches the toner amount control method. FIG. 20C illustrates ⅓ of all settable items. The remaining pages 2/3 and 3/3 can be displayed by touching a scroll button (∇ button).

In the state in FIG. 20C, if the MFP controller 1000 detects that the "color adjustment" button is pressed, a color adjustment window in FIG. 20D is displayed. After the color balance is adjusted, or the initial density values are finely adjusted, the user presses an "OK" button to change the settings about print output.

Setting when "a hold-designated job is registered in a storage device such as an HDD" will be described next with reference to FIGS. 21A and 21B. In this case, FIGS. 21A and 21B show display examples corresponding to FIG. 20C.

Figure 21A:
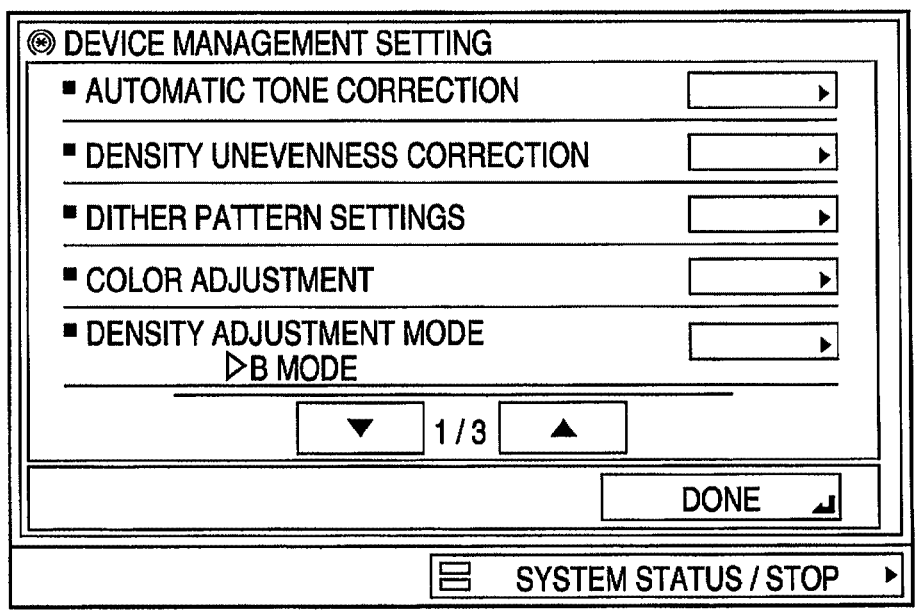
FIGS. 21A and 21B are views showing device setting parameter display examples when a print job is stored according to the embodiment.

FIG. 21A illustrates the display state of ⅓ of all items. The types of buttons displayed are the same as in FIG. 20C. In FIG. 21A, to notify the user that change of the device adjustable parameters (parameters related to image processing) that influence the print style of the hold-designated job is inhibited, relevant buttons are grayed out, as shown in FIG. 21A. When a button related to image processing shown in FIG. 21A is pressed, the MFP controller 1000 ignores the instruction input.

Figure 21B:
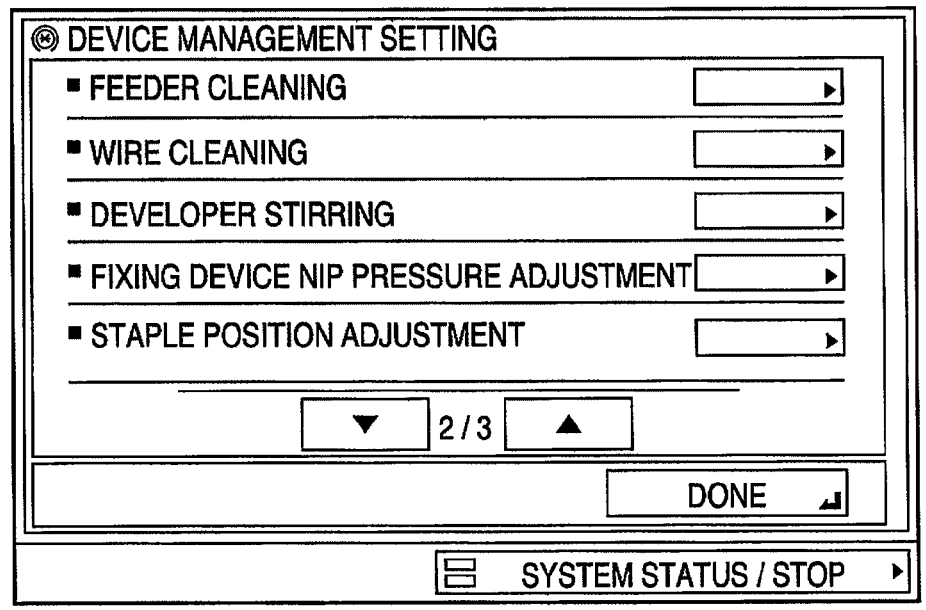

FIG. 21B shows a display example when the scroll button in FIG. 21A is pressed. Referring to FIG. 21B, a "feeder cleaning" button executes a process of removing contamination of feed rollers. Generally, for example, lead powder of a pencil sticks to the feed rollers and contaminates a document. To prevent this, about 10 blank paper sheets are set on the feeder, and the contamination of the feed rollers is transferred to them. A "wire cleaning" button cleans the charge wire of the primary charger in the printer unit by reciprocally moving a self-propelled moltoprene. This cleaning process is performed when a printing paper sheet has a stripe pattern of contamination in the sub-scanning direction. A "developer stirring" button is used to prevent density unevenness in the main scanning direction. When the button is pressed, a window to select one of the Y, M, C, and K developers is displayed. The toner in the selected developer is stirred to ensure uniform process conditions.

If the upper and lower fixing rollers press each other too tightly when a printed sheet passes through the fixing unit, the output printing paper sheet will be wrinkled. Conversely, if the rollers press each other too loosely, toner attachment may be insufficient. A "fixing device nip pressure adjustment" button adjusts the pressure. When the button is pressed, a nip pressure adjustment window is displayed to adjust the nip pressure.

A "staple position adjustment" button adjusts the stapling position of the stapler in units of millimeters to prevent stapling errors.

The buttons shown in FIG. 21B indicate device adjustable parameters (parameters related to non-image processing) which do not influence the print style of a hold-designated job. For this reason, upon detecting that a button shown in FIG. 21B was pressed, the MFP controller 1000 executes a process corresponding to the pressed button. The windows shown in FIGS. 21A and 21B can selectively be displayed.

Alternatively, if the display screen is large, all buttons of device adjustable parameters may be displayed simultaneously while discriminating between enabled buttons and disabled buttons.

When "a hold-designated job is not stored in a storage device such as an HDD", reception of a hold job can happen after the window in FIG. 20D is displayed.

Figure 22:
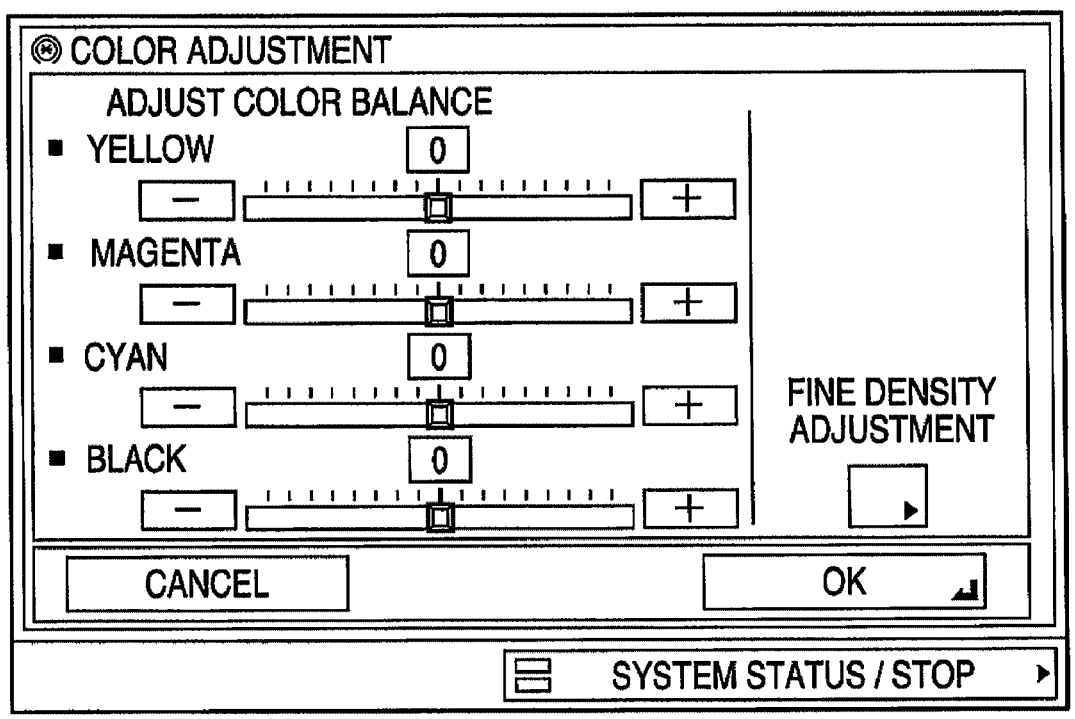
FIG. 22 is a view showing a device setting parameter display example when a print job is stored according to the embodiment.

In this case, to notify the user that it is impossible to determine the color mode settings, the MFP controller 1000 grays out an "OK" button, as shown in FIG. 22, and also ignores pressing of the "OK" button.

Figure 25:
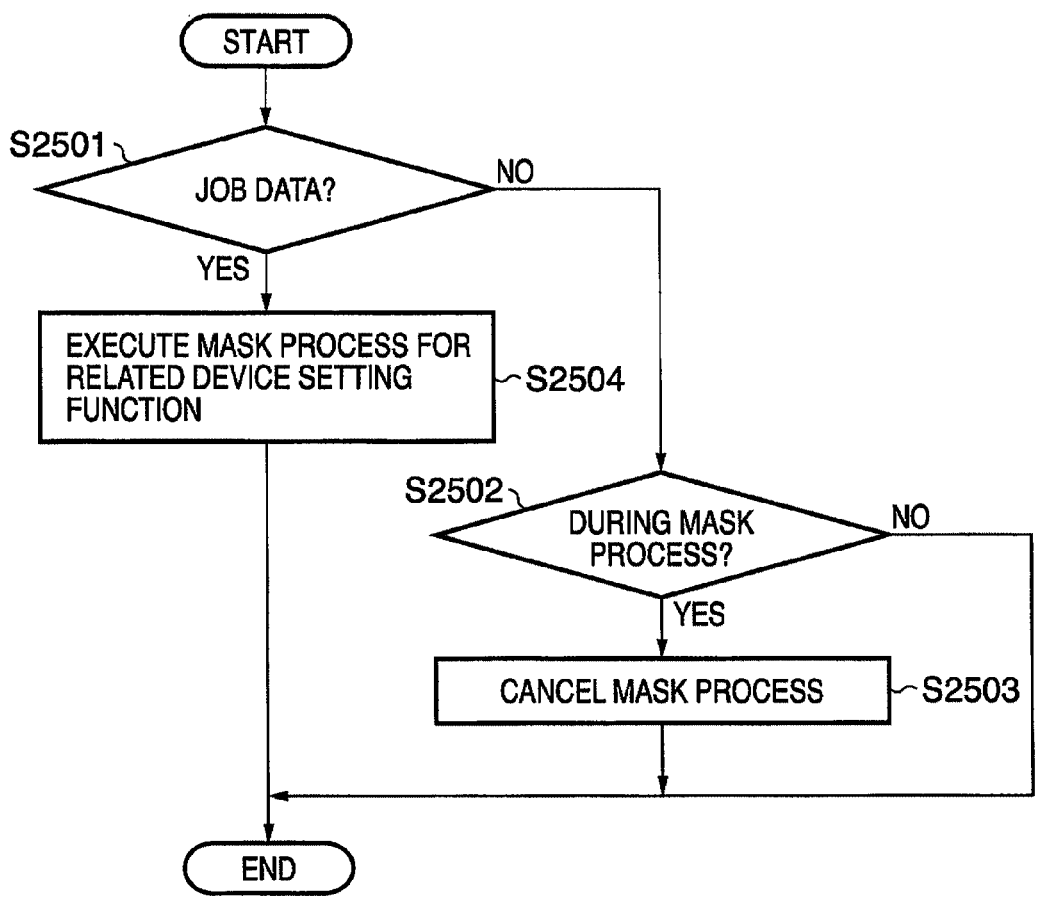
FIG. 25 is a flowchart illustrating the first embodiment.

The above sequence will be described with reference the flowchart shown in FIG. 25. In step S2501, the MFP controller 1000 determines the presence/absence of a hold job. If no print job exists, the MFP controller 1000 determines in step S2502 whether a mask process for related device setting functions is currently being executed; that is, some of the functions are displayed in a disable state. If the mask process is not being executed, the window is displayed. If the mask process is being executed, the mask process is canceled (step S2503).

On the other hand, if a print job exists in step S2501, the mask process of related device setting functions is executed.

As described above, according to this embodiment, the presence/absence of a print job is determined, and permission/inhibition of device adjustable parameter change is switched. This inhibits output of an image not desired by a user who has input a print job.

Second Embodiment

In the first embodiment, "when a hold-designated job exists in a storage means such as an HDD", the functions related to device adjustable parameters are grayed out to disable determination. In the second embodiment to be described below, a user is actively notified that the change is inhibited.

Figure 23:
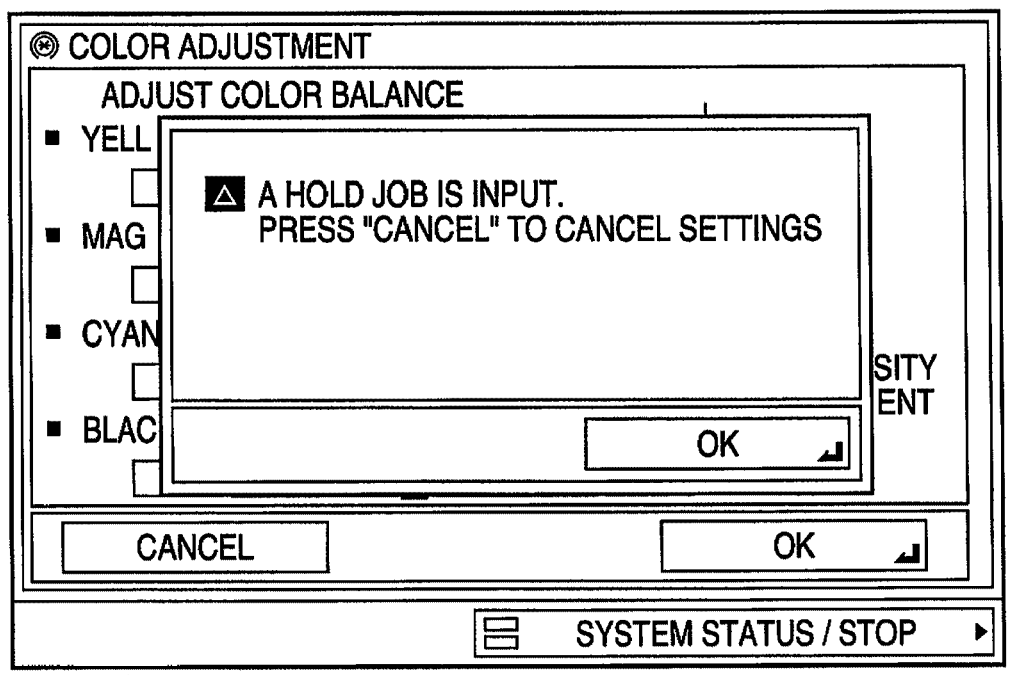
FIG. 23 is a view showing a device setting parameter display example when a print job is stored according to the embodiment.

In the second embodiment, determination is performed when the "OK" key in FIG. 20D is pressed. "When a hold-designated job exists in a storage means such as an HDD", a window shown in FIG. 23 is displayed to notify the user that it is currently impossible to determine settings.

The above sequence will be described with reference the flowchart shown in FIG. 26. In step S2601, an MFP controller 1000 determines whether a button to determine a device setting function was pressed. If no button was pressed, no process is performed.

Upon detecting press of the "OK" button, the process advances to step S2602 to determine whether a print job exists. If no print job exists, the process advances to step S2603 to determine the device setting contents. If it is determined in step S2602 that a print job exists, the process advances to step S2604 to display a message "There is a print job. Press "Cancel"". In step S2605, the MFP controller 1000 determines whether the "OK" key was pressed. If the key was pressed, the message is closed in step S2606.

This prevents output of an image not desired by a user who has input a print job, as in the first embodiment.

Third Embodiment

In the first and second embodiments, "when a hold-designated job exists in a storage means such as an HDD", settings of functions related to device adjustable parameters are inhibited. In the third embodiment, an example will be described in which a user is made to confirm whether to change a parameter when a hold-designated job exists in an HDD.

Figure 24:
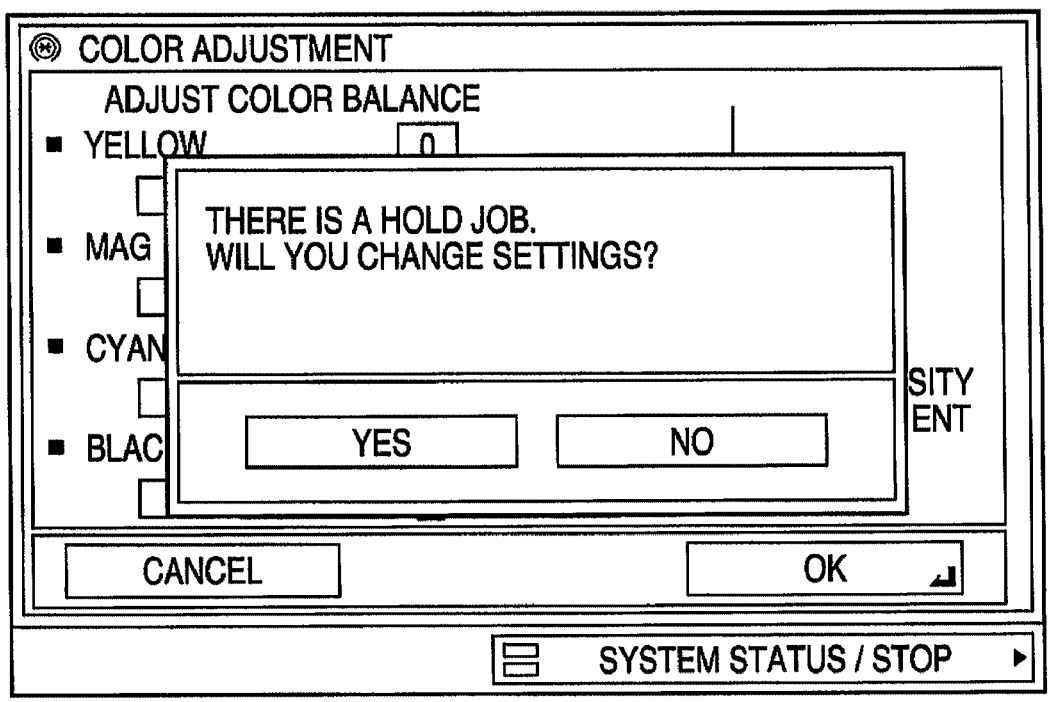
FIG. 24 is a view showing a device setting parameter display example when a print job is stored according to the embodiment.

In the third embodiment, determination is performed when the "OK" key in FIG. 20D is pressed. "When a hold-designated job exists in a storage means such as an HDD", a window shown in FIG. 24 is displayed. If an MFP controller 1000 detects touch of a "NO" button, settings are canceled, and the color adjustment window is closed. Upon detecting touch of a "YES" button, settings are determined, and the color adjustment window is closed.

Figure 27:
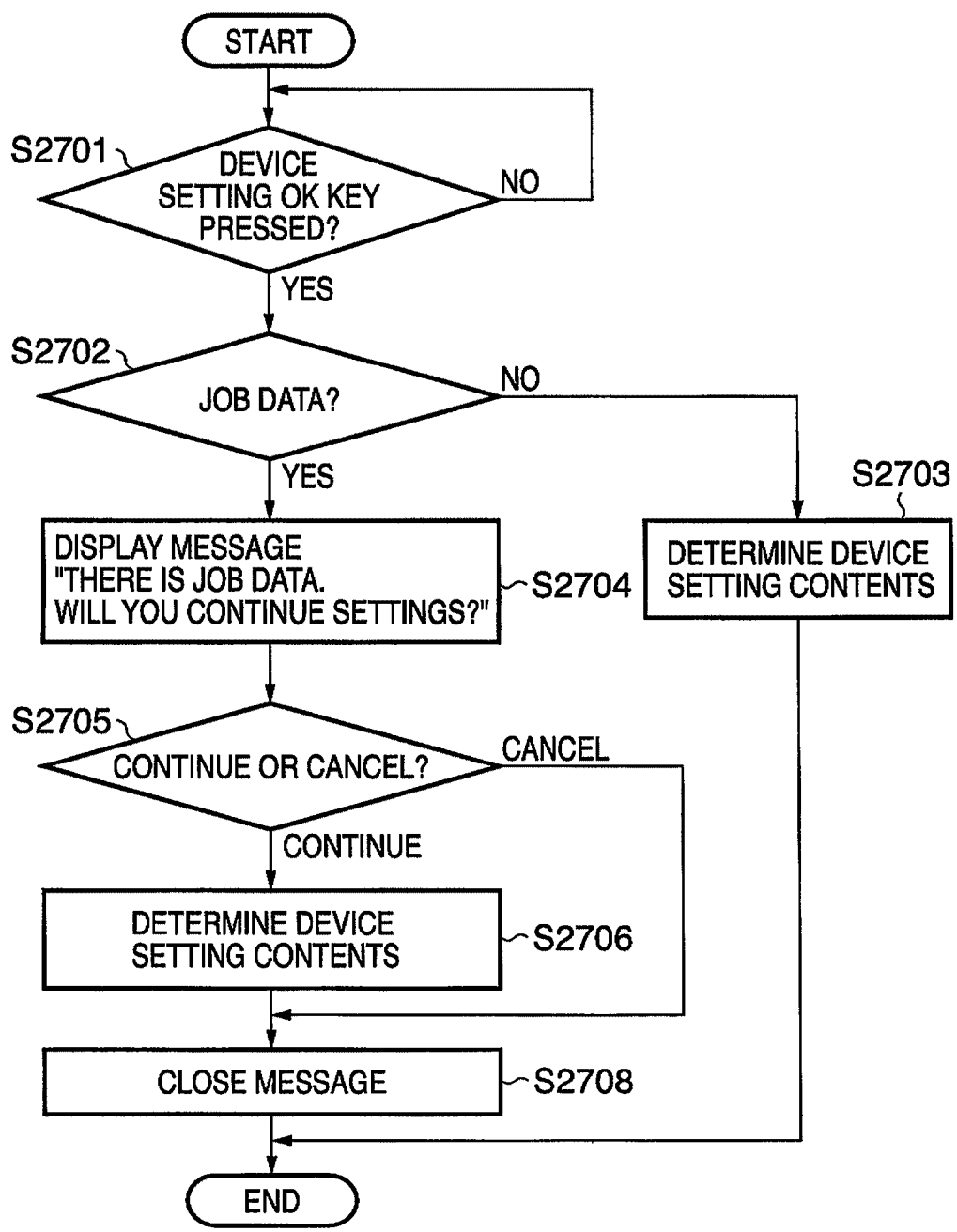
FIG. 27 is a flowchart illustrating the third embodiment.

The above sequence will be described with reference to the flowchart shown in FIG. 27. In step S2701, the MFP controller 1000 determines whether a button to determine a device setting function was pressed. If no button was pressed, no process is performed.

Upon detecting press of a button, the process advances to step S2702 to determine whether a print job exists. If no print job exists, the process advances to step S2703 to determine the device setting contents. If the presence of a print job is detected in step S2702, the process advances to step S2704 to display a message "A print job is present. Do you want to continue settings?". In step S2705, the MFP controller 1000 determines which button was pressed. If it is determined that a "cancel" button was pressed, the message displayed in step S2704 is closed. If it is determined in step S2705 that a "continue" button was pressed, the process advances to step S2706 to determine the device setting contents. In step S2708, the message displayed in step S2704 is closed.

According to this embodiment, the presence/absence of a print job is determined, and the user is made to confirm whether to change a device adjustable parameter. This allows a single user to change device adjustable parameters after input of a print job.

The embodiments of the present invention have been described above. In the embodiments, an MFP (i.e., a multi function peripheral) is used as an image forming apparatus. However, it may be a single printing apparatus having the operation unit and mass storage device described in the embodiments.

The MFP 100 according to the above-described embodiments can provide the following effects.

It is possible to cope with, for example, the problems assumed conventionally. It is also possible to form, for example, a convenient, user-friendly printing environment adaptable not only to an office environment but also to a POD environment. It is also possible to meet the needs of an actual working site in a printing environment such as a POD environment, and for example, a need to operate a system at as high a productivity as possible and a need to minimize the workload on an operator. In particular, the following effects can be obtained.

For example, in the first embodiment, when an operator A (worker) inputs a print job to the MFP 100, and an operator B (worker) executes output, change of device adjustable parameters is permitted or inhibited depending on the presence/absence of a print job, thereby preventing any change that influences the print style of the print job input by the operator A (worker).

In the second embodiment, the presence of a print job is explicitly displayed. It is therefore possible to notify the operator B of the reason that change of device adjustable parameters is inhibited.

The third embodiment assumes that the operator A (worker) inputs a print job to the MFP 100 and executes output. The settings of device adjustable parameters can be changed after input of the print job.

As described above, it is possible to flexibly form a convenient printing environment capable of coping with use cases and meeting needs, which are conventionally assumed in a POD environment, and provide various mechanisms for commercialization.

Other Embodiments

A host computer (e.g., the client PC 200 or print server 300) may execute the functions of the embodiments shown in the drawings in accordance with an externally installed program. In this case, data to display the same operation windows as those described in the embodiments is externally installed to provide the above-described various kinds of user interface windows on the display unit of the host computer. The UI windows shown in FIGS. 5 and 6 have been described as examples. In this arrangement, the present invention is applicable even when an information group including a program is supplied, to an output device, from a storage medium such as a CD-ROM, flash memory, or FD or from an external storage medium via a network.

As described above, the object of the present invention can also be achieved by supplying a storage medium which records software program codes for implementing the functions of the above-described embodiments to a system or apparatus and causing the computer (or CPU or MPU) of the system or apparatus to read out and execute the program codes stored in the storage medium.

In this case, the program codes read out from the storage medium implement the new functions of the present invention by themselves, and the storage medium which stores the program codes constitutes the present invention.

The program can take any form such as an object code, a program to be executed by an interpreter, or script data to be supplied to the OS as long as the functions of the program can be obtained.

Examples of the storage medium to supply the program are a flexible disk, hard disk, optical disk, magnetooptical disk, MO, CD-ROM, CD-R, CD-RW, magnetic tape, nonvolatile memory card, ROM, and DVD.

In this case, the program codes read out from the storage medium implement the functions of the above-described embodiments by themselves, and the storage medium which stores the program codes constitutes the present invention.

The following program supply method is available. A client computer may be connected to a web page on the Internet via a browser to download the computer program itself of the present invention or a compressed file containing an automatic installation function from the web page to a recording medium such as a hard disk. The program codes contained in the program of the present invention may be divided into a plurality of files so that the user can download the files from different web pages. That is, a WWW server or FTP server which allows a plurality of users to download the program file to implement the functional processing of the present invention is also incorporated in the claims of the present invention.

The program of the present invention may be encrypted, stored in a storage medium such as a CD-ROM, and distributed to users. Any user who satisfies predetermined conditions can download key information to decrypt the program from a web page via the Internet. The user can execute the encrypted program by using the key information and install the program onto the computer.

The functions of the above-described embodiments are implemented not only when the computer executes the readout program codes but also when, for example, the OS (Operating System) running on the computer partially or wholly executes actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit partially or wholly executes actual processing.

The present invention is applicable to a system including a plurality of devices or an apparatus including a single device. The present invention is adaptable even when it is achieved by supplying a program to the system or apparatus. In this case, the system or apparatus can enjoy the effects of the present invention by reading out the program expressed by software for achieving the present invention from the storage medium.

The present invention is not limited to the above-described embodiments, and various changes and modifications (including organic combinations of the embodiments) can be made based on the spirit of the present invention without departing from the scope of the present invention. For example, in the embodiments, the controller 1000 in the MFP 100 principally executes various kinds of control. However, for example, an external controller distinct from the case of the MFP 100 may be able to partially or wholly execute the various kinds of control.

Various examples and embodiments of the present invention have been described above. For those skilled in the art, the spirit and scope of the present invention are not limited to the specific explanation in the specification. However, for example, the following arrangements are preferable, as in the above-described embodiments.

First, the printing system of the embodiment is assumed to be a printing system adapted to allow an operator to change, via a user interface portion such as the operation unit 1008 described in the embodiment, a device adjustable parameter related to print processing by the MFP 100 which can execute print processing of a job stored in the HDD 1500 capable of storing the print data of a plurality of jobs.

Assuming this arrangement, the controller 1000 confirms whether the HDD 1500 stores a hold job which requires the holding of print target data in the HDD 1500 at least during a period from storage of the print target data in the HDD 1500 to input of a print start instruction via the user interface portion.

Assume that the controller 1000 confirms that no print job corresponding to the hold job exists in the HDD 1500. This indicates that the HDD 1500 does not contain the print target data (image data) of the hold job. In this case, the controller 1000 permits the operator to change, via the user interface portion, a device adjustable parameter related to print processing by the MFP 100.

On the other hand, assume that the controller 1000 confirms that a print job corresponding to the hold job does exist in the HDD 1500. This indicates that the HDD 1500 contains the print target data (image data) of the hold job. In this case, the controller 1000 prevents (also called suppresses or restricts) the operator to change, via the user interface portion, a device adjustable parameter related to print processing by the MFP 100. Note that inhibition can indicate that any operation by the operator is received. As in the above embodiment, an alert is presented to the operator via the user interface portion of the embodiment. If the operator confirms the alert and still requires change of a device adjustable parameter, an instruction to do so is input via the user interface portion. Upon receiving the instruction, the controller 1000 permits change of the device adjustable parameter and causes the MFP 100 to execute the change. If the operator confirms the alert and desires no change of the parameter, an instruction to do so is input via the user interface portion. Upon receiving the instruction, the controller 1000 allows completion of the process without change. As described above, the MFP 100 is inhibited at least from changing the adjustable parameter without making the operator confirm the change of the adjustable parameter. This arrangement is also a representative example included in the sense of "inhibition".

An arrangement corresponding to the above-described arrangement is a representative example included in the arrangement disclosed in the embodiment.

As described above, according to the embodiment, it is possible to cope with the problems conventionally assumed. It is also possible to form, for example, a convenient, user-friendly printing environment adaptable not only to an office environment but also to a POD environment. In particular, for example, employment of both the job holding function of saving a job to be printed in a storage device until an output timing desired by an operator and the function of enabling an operator (worker) of the printing system to change a device adjustable parameter prevents any new problem so no printed product not desired by a customer is produced. It is also possible to meet the needs of an actual working site in a printing environment such as a POD environment, and for example, a need for operating a system at as high a productivity as possible and a need to minimize the workload on an operator. In particular, the following effects can be obtained in addition to the above effects.

For example, in the first embodiment, when an operator (worker) A inputs a print job to the MFP 100, and an operator (worker) B executes output, change of device adjustable parameters is permitted or inhibited depending upon the presence/absence of a print job, thereby preventing any change that influences the print style of the print job input by the operator A (worker).

In the second embodiment, the presence of a print job is explicitly displayed. It is therefore possible to notify the operator B of the reason that change of device adjustable parameters is inhibited.

The third embodiment assumes that the operator (worker) A inputs a print job to the MFP 100 and executes output. The settings of device adjustable parameters can be changed after input of the print job.

As described above, it is possible to flexibly form a convenient printing environment capable of coping with use cases and meeting needs which are conventionally assumed in a POD environment, and to provide various mechanisms for commercialization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-011956, filed Jan. 22, 2007, which is hereby incorporated by reference herein in its entirety.

What is claimed is:

1. A system adapted to enable a user interface to change an adjustable parameter about processing by a printing system, the printing system being adapted to perform print processing for a job that print data are stored in a storage unit, the system comprising:
a first controller adapted to permit a change of the adjustable parameter by the user interface in a case where print data of a certain job having a certain attribute does not exist in the storage unit, the print processing of the print data of the certain job being performed in response to an instruction which is inputted by an indicator after storing the print data in the storage unit; and
a second controller adapted to inhibit change of adjustable parameters by the user interface in a case where the print data of the certain job exists in the storage unit; and
wherein
the printing system is adapted to receive a plurality of jobs including the certain job and another job having another attribute, and
the storage unit stores the print data of the certain job separately from print data of the other job.

2. The system according to claim 1, wherein each of a plurality of adjustable parameters about a plurality of print processing operations by the printing system can be changed by using the user interface, and
of the plurality of adjustable parameters, change of an adjustable parameter about processing necessary for the certain job is inhibited, and change of another adjustable parameter different from the adjustable parameter is permitted.

3. The system according to claim 1, wherein the user interface notifies a user of information with which the user can identify that the change of the adjustable parameter is inhibited.

4. The system according to claim 1, wherein inhibiting the change of the adjustable parameter indicates at least one of
1) canceling the change of an adjustable parameter about processing necessary for the certain job,
2) notifying a user of an alert message by the user interface, and
3) allowing the user to select, using the user interface, whether to perform the change.

5. The system according to claim 1, wherein
the printing system is adapted to receive the certain job and/or the other job during a period in which the change of the adjustable parameter is performed using the user interface, and
the change is canceled if the certain job requiring processing about the adjustable parameter to be changed is received during the period.

6. A program product stored on a non-transitory computer-readable storage medium, the program product including a program code for causing a computer system to perform a method for enabling a user interface to change an adjustable parameter about processing by a printing system, the printing system being adapted to perform print processing for a job for which print data are stored in a storage unit, the method comprising:
permitting a change of the adjustable parameter by the user interface in a case where print data of a certain job having a certain attribute does not exist in the storage unit, the print processing of the print data of the certain job being performed in response to an instruction which is input by an indicator after storing the print data in the storage unit; and
inhibiting the change of the adjustable parameter by the user interface in a case where the print data of the certain job exists in the storage unit; and
wherein
the printing system is adapted to receive a plurality of jobs including the certain job and another job having another attribute, and
the storage unit stores the print data of the certain job separately from print data of the other job.

* * * * *